United States Patent
Ratsaby et al.

(10) Patent No.: US 9,870,434 B1
(45) Date of Patent: Jan. 16, 2018

(54) TECHNIQUES FOR FILTERING WORKLOAD AND PERFORMANCE DATA

(71) Applicant: EMC IP Holding Company LLC, Hopkinton, MA (US)

(72) Inventors: Gil Ratsaby, Mevaseret Zion (IL); Ophir Aharoni, Brookline, MA (US); Almog Tabak, Milford, MA (US); Dan Aharoni, Brookline, MA (US); Ilies Idrissi, Allston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 565 days.

(21) Appl. No.: 14/310,150

(22) Filed: Jun. 20, 2014

(51) Int. Cl.
G06F 17/30 (2006.01)
(52) U.S. Cl.
CPC .............................. G06F 17/30994 (2013.01)
(58) Field of Classification Search
None
See application file for complete search history.

(56) References Cited

U.S. PATENT DOCUMENTS

| 6,671,691 | B1* | 12/2003 | Bigus | G06F 17/30398 |
| 6,925,608 | B1* | 8/2005 | Neale | G06F 17/30637 |
| | | | | 707/E17.062 |
| 8,745,034 | B1* | 6/2014 | Fuller | G06F 17/30457 |
| | | | | 707/716 |
| 2005/0027858 | A1* | 2/2005 | Sloth | H04L 41/5009 |
| | | | | 709/224 |
| 2005/0256852 | A1* | 11/2005 | McNall | G06F 17/30398 |
| 2009/0044096 | A1* | 2/2009 | Gupta | G06F 8/51 |
| | | | | 715/230 |
| 2009/0125459 | A1* | 5/2009 | Norton | G06N 5/025 |
| | | | | 706/10 |
| 2014/0059069 | A1* | 2/2014 | Taft | G06F 17/30442 |
| | | | | 707/765 |
| 2015/0263986 | A1* | 9/2015 | Park | H04L 47/781 |
| | | | | 709/226 |
| 2015/0286625 | A1* | 10/2015 | Escarguel | G06Q 30/0242 |
| | | | | 715/220 |

OTHER PUBLICATIONS

Michael Schwartz, "Data gathering and analysis for Migration, Disaster Recovery and Business Continuance in Symmetrix environments," EMC Proven Professional Knowledge Sharing, Nov. 2007, 39 pp.

* cited by examiner

*Primary Examiner* — Richard Bowen
(74) *Attorney, Agent, or Firm* — Muirhead and Saturnelli, LLC

(57) ABSTRACT

Described are techniques for processing collected workload and performance data. Components of a component category are selected, filtering criteria is specified, the filtering criteria is applied to the collected workload and performance data for the components selected and thereby generating filtered data results, and the filtered results are viewed. The filtering criteria may include a first operation and a first set of one or more metrics included in the collected workload and performance data for the components selected. The first operation may be applied to the first set of one or more metrics and may be selected from a plurality of operations. The plurality of operations may include at least one arithmetic operation, at least one logical operation and at least one relational operation.

17 Claims, 17 Drawing Sheets

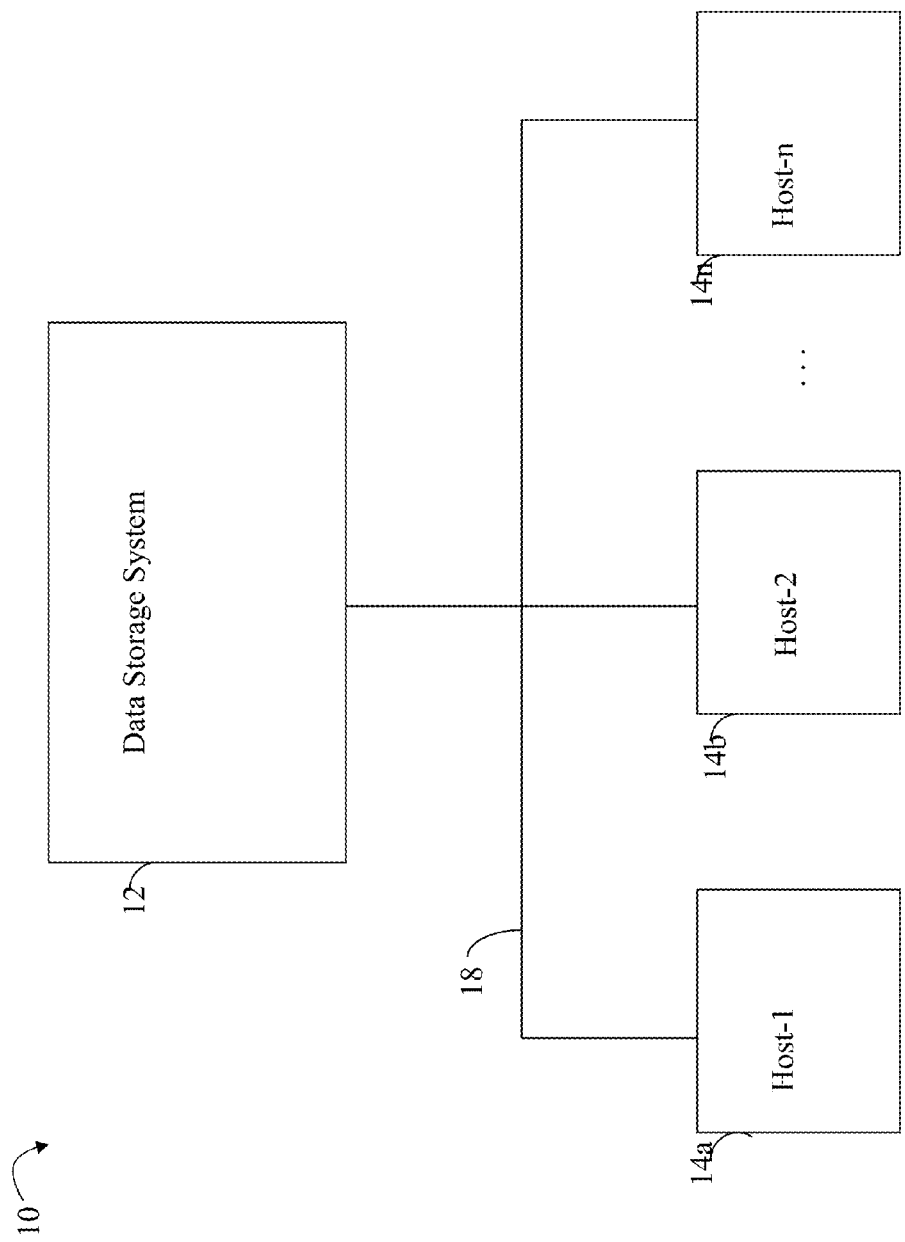

TECHNIQUES FOR FILTERING WORKLOAD AND PERFORMANCE DATA

BACKGROUND

Technical Field

This application generally relates to data filtering tools and associated user interfaces.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

SUMMARY OF THE INVENTION

In accordance with one aspect of the invention is a method for processing collected workload and performance data comprising: selecting one or more components of a component category; specifying filtering criteria, wherein the filtering criteria includes a first operation and a first set of one or more metrics included in the collected workload and performance data for the one or more components selected, wherein said first operation is applied to the first set of one or more metrics and is selected from a plurality of operations, the plurality of operations including at least one arithmetic operation, at least one logical operation and at least one relational operation; applying the filtering criteria to the collected workload and performance data for the one or more components selected and thereby generating filtered data results; and viewing the filtered data results. The at least one arithmetic operation may include any of addition, subtraction, multiplication, division and exponential operation. The at least one logical operation may include any of a logical NOT operation, a logical AND operation, a logical OR operation, a logical XOR (exclusive OR) operation, a logical NOT operation, a logical NOR (logical NOT of logical OR) operation, a logical NAND (logical NOT of logical AND) operation. The at least one relational operation may include any of greater than, less than, equal to, not equal to, greater than or equal to, and less than or equal to. The plurality of operations may include a set operation. The method may include defining a new user-defined metric based on the filtering criteria. The method may include selecting a first component set of one or more components of a component category; specifying second filtering criteria, wherein the second filtering criteria includes the new user-defined metric; applying the second filtering criteria to the collected workload and performance data for the first component set and thereby generating second filtered data results; and viewing the second filtered data results. The component category may be selected from a plurality of component categories including any of a category of front end components of a data storage system, a category of back end components of a data storage system, a category of front end adapters that receive data operations from clients at a data storage system, a category of disk adapters that access physical storage devices of a data storage system to perform I/O operations, a category of physical storage devices, a category of logical volumes, a category of remote data facility groups, a category of virtual pools, a category of buses, a category of cache, and a category of adapters used with a remote data facility for data replication. The component category selected may be the category of front end components and the first set of one or more metrics may include any of a read hit rate, a read miss rate, a read rate, a write rate, a sequential read rate, a random read rate, a write hit rate, a write miss rate, a sequential write rate, a random write rate, a queue depth denoting an average number of pending I/O operations, overall average I/O rate, average response time, average I/O size, average write I/O size, and average read I/O size. The component category selected may be the category of back end components and the first set of one or more metrics may include any of overall average I/O rate, a read rate, a sequential read rate, a random read rate, a write rate, a sequential write rate, a random write rate, a backend write rate denoting a rate of write operations performed which do not use a front end component, a backend read rate denoting a rate of read operations performed which do not use a front end component, average I/O size, average write I/O size, average read I/O size, average read data transfer rate, average write data transfer rate, average response time. The component category selected may be the category of physical storage devices, and the first set of one or more metrics may include any of overall average I/O rate, a read rate, a sequential read rate, a random read rate, a write rate, a sequential write rate, a random write rate, a backend write rate denoting a rate of write operations performed which do not use a front end component, a backend read rate denoting a rate of read operations performed which do not use a front end component, average I/O size, average write I/O size, average read I/O size, average read data transfer rate, average write data transfer rate, average response time. The component category selected may be the category of logical volumes and the first set of one or more metrics may include any of a read hit rate, a read miss rate, a read rate, a write rate, a sequential read rate, a random read rate, a write hit rate, a write miss rate, a sequential write rate, a random write rate, a queue depth denoting an average number of pending I/O operations, overall average I/O rate, average response time, average I/O size, average write I/O size, average read I/O size, a prefetch cache hit ratio, and a prefetching rate at which data is prefetched. The filtering criteria may further include one or more properties of a logical volume, the one or more properties including any of a logical volume type, a cylinder size, and a RAID protection level. Specifying the filtering criteria may include performing one or more user interface selections. Specifying the filtering criteria may include inputting an expression.

In accordance with another aspect of the invention is a system comprising: a data storage system including a plurality of components, wherein each of the plurality of components is included in one of a plurality of component categories; and a memory including code stored therein that, when executed by a processor, performs a method for processing collected workload and performance data, the method comprising: selecting one or more components from the plurality of components, wherein the one or more components are included in a first category of the plurality of component categories; performing one or more user interface selections to specify filtering criteria, wherein the filtering criteria includes a first operation and a first set of one or more metrics included in the collected workload and performance data for the one or more components selected, wherein said first operation is applied to the first set of one or more metrics and is selected from a plurality of operations; applying the filtering criteria to the collected workload and performance data for the one or more components selected and thereby generating filtered data results; viewing the filtered data results; and defining a user-defined metric based on the filtering criteria. The method may include defining second filtering criteria including the user-defined metric and using the second filtering criteria to filter the collected workload and performance data in accordance with another one or more components selected from the plurality of components.

In accordance with another aspect of the invention is a non-transitory computer readable medium comprising code stored thereon that, when executed, performs a method comprising: selecting one or more components of a component category; specifying filtering criteria, wherein the filtering criteria includes a first operation and a first set of one or more metrics included in the collected workload and performance data for the one or more components selected, wherein said first operation is applied to the first set of one or more metrics and is selected from a plurality of operations, the plurality of operations including at least one arithmetic operation, at least one logical operation and at least one relational operation; applying the filtering criteria to the collected workload and performance data for the one or more components selected and thereby generating filtered data results; and viewing the filtered data results. The at least one arithmetic operation may include any of addition, subtraction, multiplication, division and exponential operation. The at least one logical operation may include any of a logical NOT operation, a logical AND operation, a logical OR operation, a logical XOR (exclusive OR) operation, a logical NOT operation, a logical NOR (logical NOT of logical OR) operation, a logical NAND (logical NOT of logical AND) operation.

BRIEF DESCRIPTION OF THE DRAWINGS

Features and advantages of the present invention will become more apparent from the following detailed description of exemplary embodiments thereof taken in conjunction with the accompanying drawings in which:

FIG. 1 is an example of an embodiment of a system that may utilize the techniques described herein;

DETAILED DESCRIPTION OF EMBODIMENT(S)

Figure 2A:
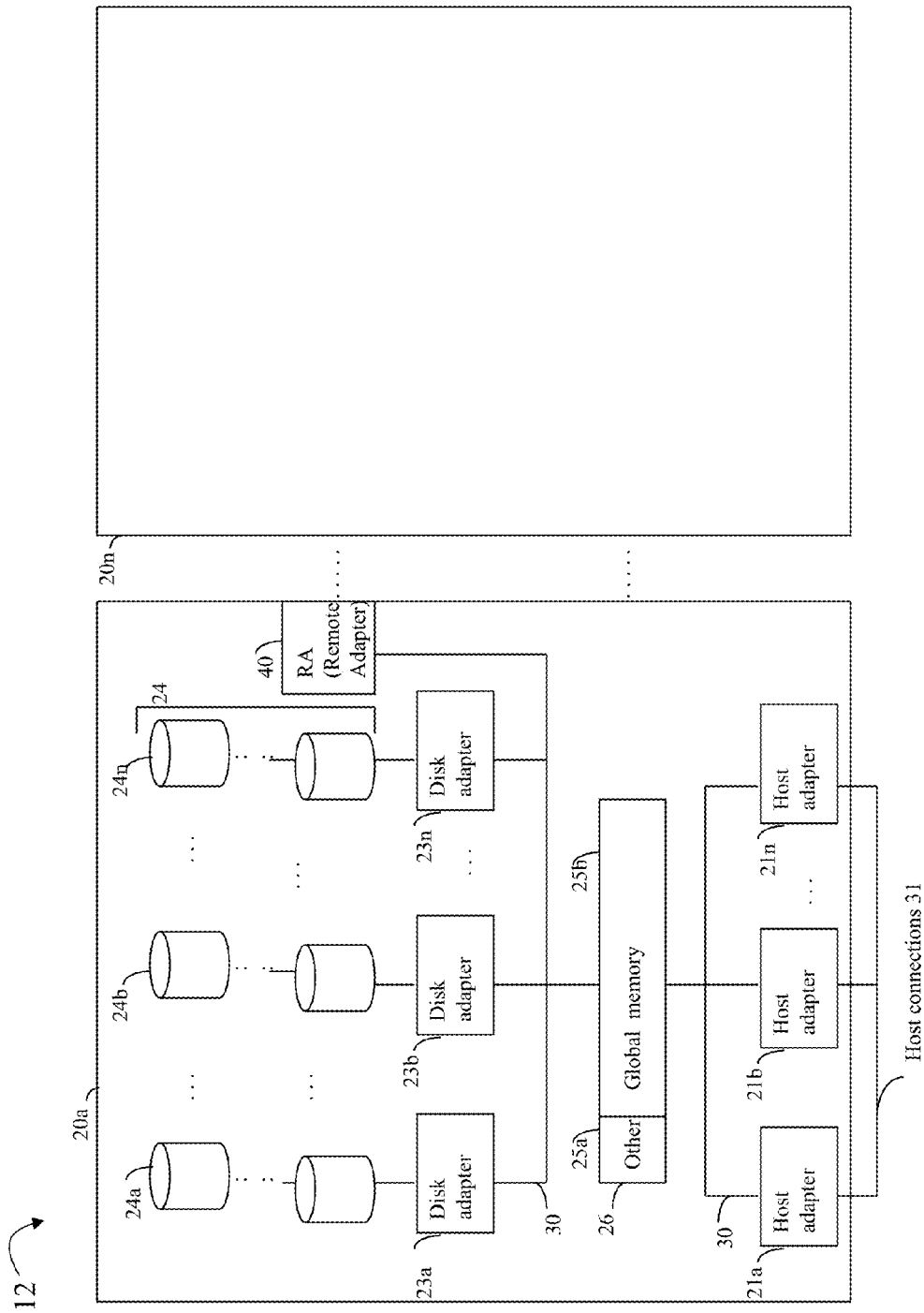
FIG. 2A is an example of an embodiment of a data storage system.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n. In this arrangement, each of the n groupings of disks may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DAs access the physical storage devices, such as the disk drives, in connection with performing I/O operations. Data residing on a disk drive may be accessed by the DA following a data request in connection with I/O operations that other directors originate. Such I/O operations may be received from external data storage system clients, such as a host, or may also be generated by data-storage system internal tasks and processing.

Figure 2B:
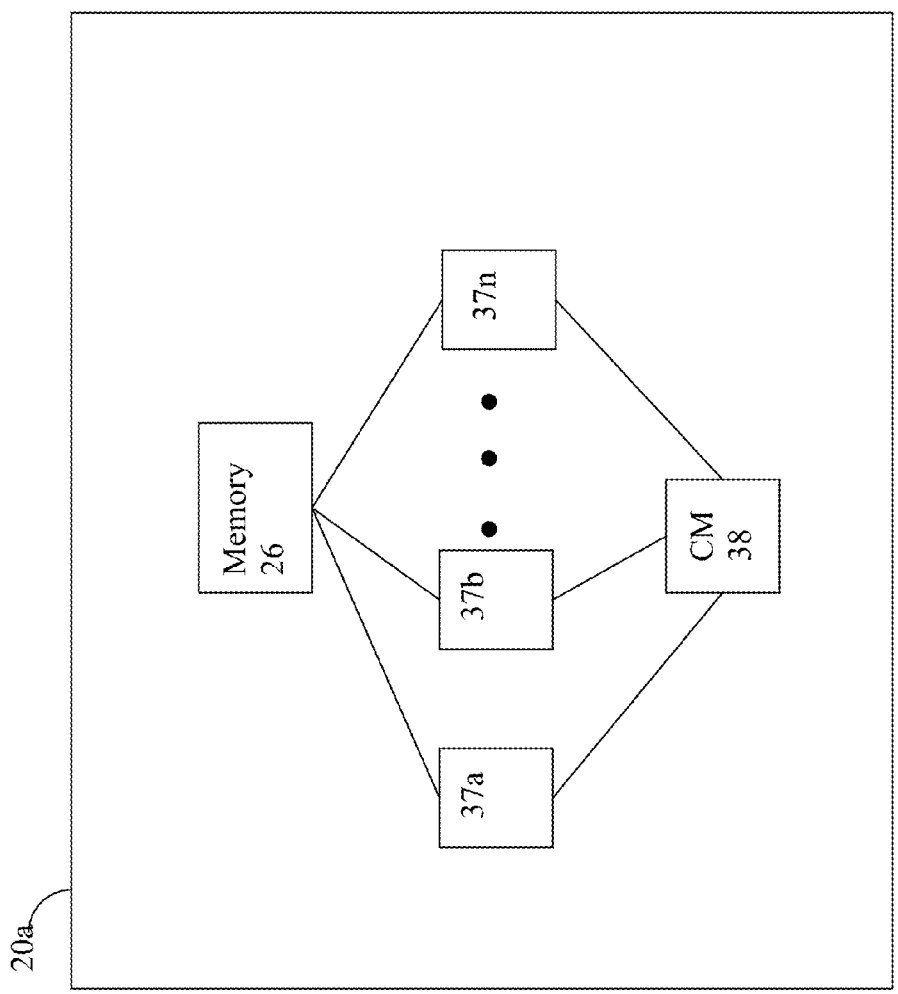
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

An application may execute on a host where the application performs I/O operations issued to the data storage system. In some embodiments in accordance with techniques herein, a write operation from the host may be received by an HA of the data storage system where the HA stores the write data in a global cache (e.g. data storage system cache accessible to and used by multiple directors of the data storage system). Such write operation data stored in the cache may be marked as write pending (WP) which is then destaged or written out to a physical storage device, such as a disk, at a later point in time. Once the write operation data is written to cache, an acknowledgement regarding completion of the write operation may be returned to the host even though such write data is not actually yet written out to physical storage. At a later point in time, a DA destages the WP data of the write operation whereby the DA reads the WP data from the cache and stores the WP data on the appropriate physical storage device.

In some embodiments in accordance with techniques herein, a read operation from the host may be received by an HA of the data storage system. In servicing a request, such as a request to read data, the data storage system may utilize caching. For servicing a read operation, the data storage system may first try to service the read request using data stored in cache. If the requested read data is all in cache, the read may be characterized as a read hit. Otherwise, if the requested read data is not all located in cache, the read may be characterized as a read miss whereby the data storage system may retrieve any portions of the requested data which are currently not stored in cache from physical storage device(s), store the retrieved data in cache, and then return the requested read data to the host. Data which is retrieved from physical storage may be stored in cache for servicing possible future read requests for the same data. In this manner, a first read request that is a read miss results in requested read data being stored in cache whereby a second subsequent read for the same read data now stored in cache results in a cache hit. Such caching techniques are utilized with a goal of increasing performance of the data storage system.

In connection with data storage systems, as well as more generally other types of systems such as computer systems, tools may be provided. For example, software tools may be used which provide a user with a user interface to view various aspects of workload and/or performance data (e.g. view different metrics such as number of reads vs writes, average response times for different physical drives or logical devices, number of reads which are sequential and random, average I/O size, average I/O throughput or rate such as I/Os per second, and the like). Described in following paragraphs are techniques that may be used in connection with such tools that allow the user to specify filtering criteria that may include simple as well as complex expressions. Such expressions may include arithmetic, relational, and/or logical operations utilizing one or more selected performance and/or workload metrics, properties, and the like (more generally any suitable filtering criteria). An embodiment of a software tool in accordance with techniques herein may include a user interface, such as a graphical user interface, which provides a user with the functionality to define, apply, and save such flexible and varied expressions and operations for any suitable purpose such as, for example, to assist the user generally in problem solving/trouble shooting. For example, an embodiment of a tool in accordance with techniques herein may allow a user to define an expression using such a user interface whereby the expression defines criteria that assists the user in filtering through large amounts of collected data and allowing the user to draw conclusions not otherwise obvious from just viewing the raw, collected workload and/or performance data (e.g., to facilitate "drilling down" through collected information as part of problem analysis to determine a cause of a performance problem).

In exemplary embodiments described herein, techniques herein may be incorporated into a graphical user interface of a performance tool which may be used to perform operations and calculations on various workload metrics relevant to data storage system performance. With such an interface, a user may define a desired expression to perform or apply one or more selected operations (e.g., mathematical and/or logical operations) on one or more metrics with respect to one or more components of the data storage system. The user may apply, as well as save, the defined expression which performs such operations.

Particular examples are described herein which may utilize selected mathematical operations, logical operations, components, and/or metrics. However, it will be generally appreciated by those skilled in the art that techniques herein may be used with any suitable expression formed using any one or more mathematical operations (e.g., addition(+), subtraction (−), multiplication (*), division(/, ÷), exponential operation ("" where XY denotes X is raised to the Yth power, Y being the exponent X being the base)), any one or more logical operations (e.g., NOT, AND, OR, NOR (logical NOT of the logical OR), XOR (exclusive OR), NAND (logical NOT of the logical AND), etc.), any one or more relational operators (e.g., greater than (>), less than (<), equal to (=), not equal to (!=, < >), greater than or equal to (≥), less than or equal to (≤)), any one or more set operations, any one or more performance metrics (some of which are noted elsewhere herein), any one or more components (some of which are noted elsewhere herein), and the like. Such expressions may be incorporated into any one or more statements such as to conditionally perform processing or operations (e.g., IF-THEN statements, IF-THEN-ELSE statements).

In one embodiment in accordance with techniques described herein, the performance tool may be referred to as the workload calculator providing the user interface allowing the user to define and use various workload metrics to perform desired workload calculations.

Figure 3A:
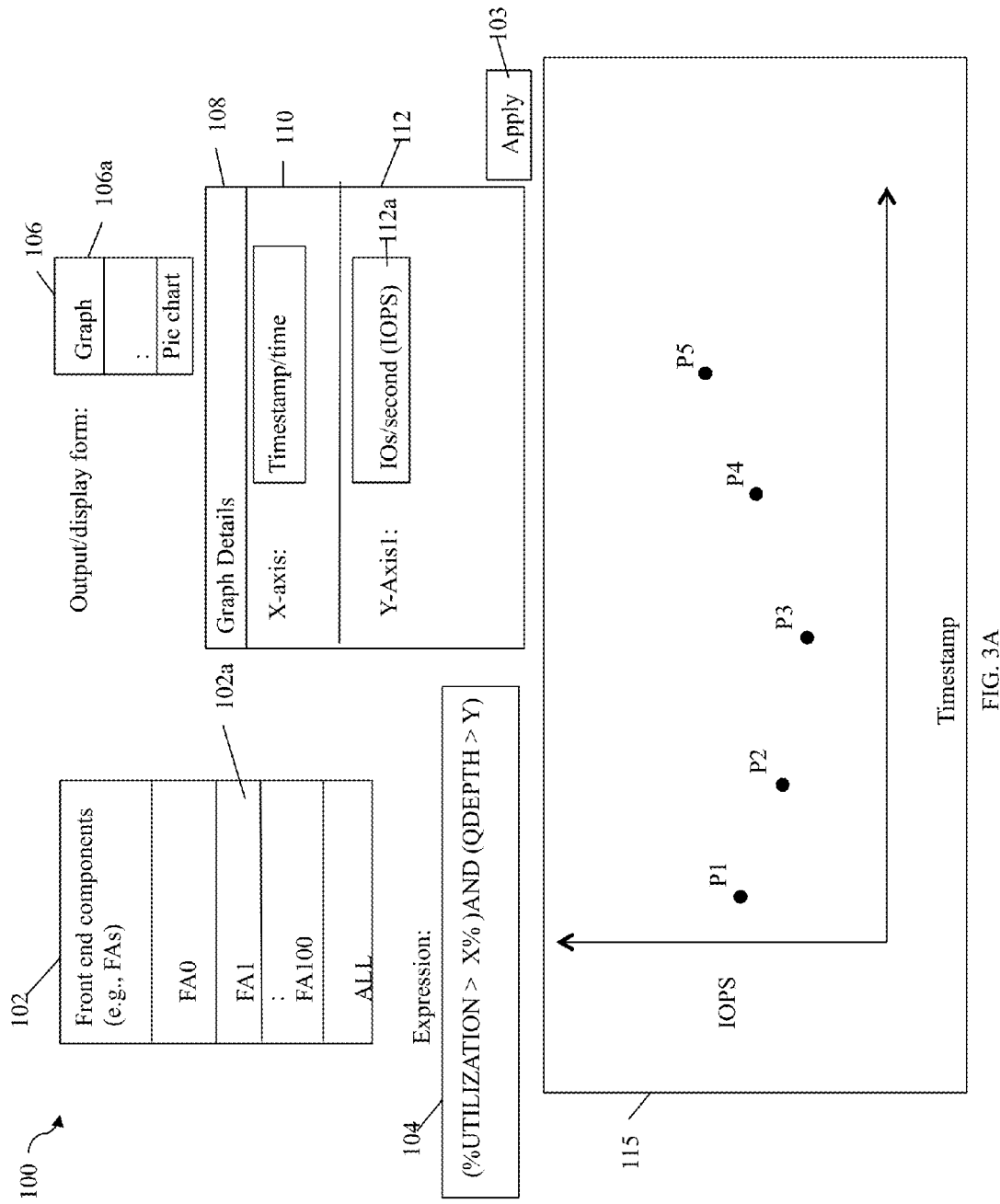
FIGS. 3A, 3B, 3C, 4, 5, 6, 7, 8, 9, 10, 11A, 11B and 11C are examples of information that may be included in user interface displays in an embodiment in accordance with techniques herein.

Referring to FIG. 3A, shown is an example 100 of elements that may be included in a user interface display in an embodiment in accordance with techniques herein. The example 100 illustrates elements that may be displayed in a user interface in connection with selecting a component of the data storage system, defining an expression, and then displaying data in accordance with the selected component and defined expression. As described below, element 102 may be used to select the particular component, element 104 may be used in connection with defining an expression, element 106 may be used in connection with specifying the format of the displayed results, and element 108 may be used to identify the particular data displayed.

The example 100 includes a list 102 of front end components of the data storage system. Such front end components in this example may include the various FAs that communicate with external clients such as, for example, that receive I/Os from one or more hosts. A user may select a particular FA from the list 102. In this example, a user may select FA1 102a. Selection of 102a, as well as other UI selections, may be made in any suitable manner (e.g., selection via mouse key click, finger on tracking pad or touch screen, and the like).

The user interface 100 may include an area 104 where a user may define an expression whereby some specified resulting data (described below) is to be displayed for occurrences where the expression 104 evaluates to true. In this example, the expression may be input into area 104 via typing in a text format. An embodiment may include a set of defined metrics and operations and the user may input an expression in accordance with a defined syntax that may vary with embodiment. In this example, defined metrics may include % UTILIZATION and QDEPTH. % UTILIZATION may denote a percentage of utilization with respect to one or more selected components. % Utilization may be a measurement of how busy a component is within a particular time period and may indicate a percentage of the time that the component is not idle. QDEPTH (queue depth) may denote a number of pending I/Os. Thus, for an FA, QDEPTH may be an integer value denoting a number of pending I/O operations (e.g., I/Os which have been received at the FA and are in progress).

In this example, a user may enter an expression in area 104 which indicates to display specified data (described below) when % UTILIZATION is greater than the specified threshold X % and also when the QDEPTH is greater than the specified threshold Y. X % may be some integer between 1 and 100, inclusively, denoting a percentage. Y may be an integer within a specified or defined range, such as an integer between 1 and MAX, where MAX may be the maximum possible queue depth. For example, X may be 50 and Y may be 10 so that the expression in 104 is (% UTILIZATION>X %) AND (QDEPTH>Y).

The user interface may also include a menu 106 from which a user may select a particular output or display form. Generally, menu 106 may include the one or more possible forms in which the resulting data may be displayed where such forms may include a graph, a list, pie chart, histogram, and the like, as may vary with embodiment. In this example a user may select graph 106a as the output or display form. Element 108 may be an area in which a user may select the particular metrics of the X and Y axis of the graph. In this example 110 indicates that the X-axis metric includes the timestamps or various times of the associated displayed data of the Y-axis, and the Y-axis metric is IOPS or I/O operations per second (e.g., more generally I/O rate). Generally, a timestamp may identify a particular time of day along with possibly other time-related information such as month, day and year of data collected. Thus, in this example, a graph is displayed of IOPS at the various timestamps for the selected FA1 at which FA1's % UTILIZATION is greater than X % AND FA1's QUEUE DEPTH is also greater than Y. It should be noted that the different metrics 110, 112 of the X axis and Y axis may be input in any suitable manner using any suitable UI elements. For example, an embodiment may allow a user to select such metrics from a menu.

Once the user has made various selections and inputs in connection with 102, 106 and 108, a user may then select the apply button 103 to apply the selected inputs to the collected data and display the desired results or output in area 115. Thus, area 115 may be updated to include the illustrated graph in response to selection of 103. In this example, 115 illustrates 5 points P1-P5 denoting the IOPS or I/O rate for FA1 and associated times/timestamps when FA1's % UTILIZATION and QDEPTH result in the expression 104 evaluating to true.

It should be noted that a user may generally be allowed to enter an expression including any one or more operators, one or more metrics, and/or other filtering criteria as described herein.

Figure 3B:
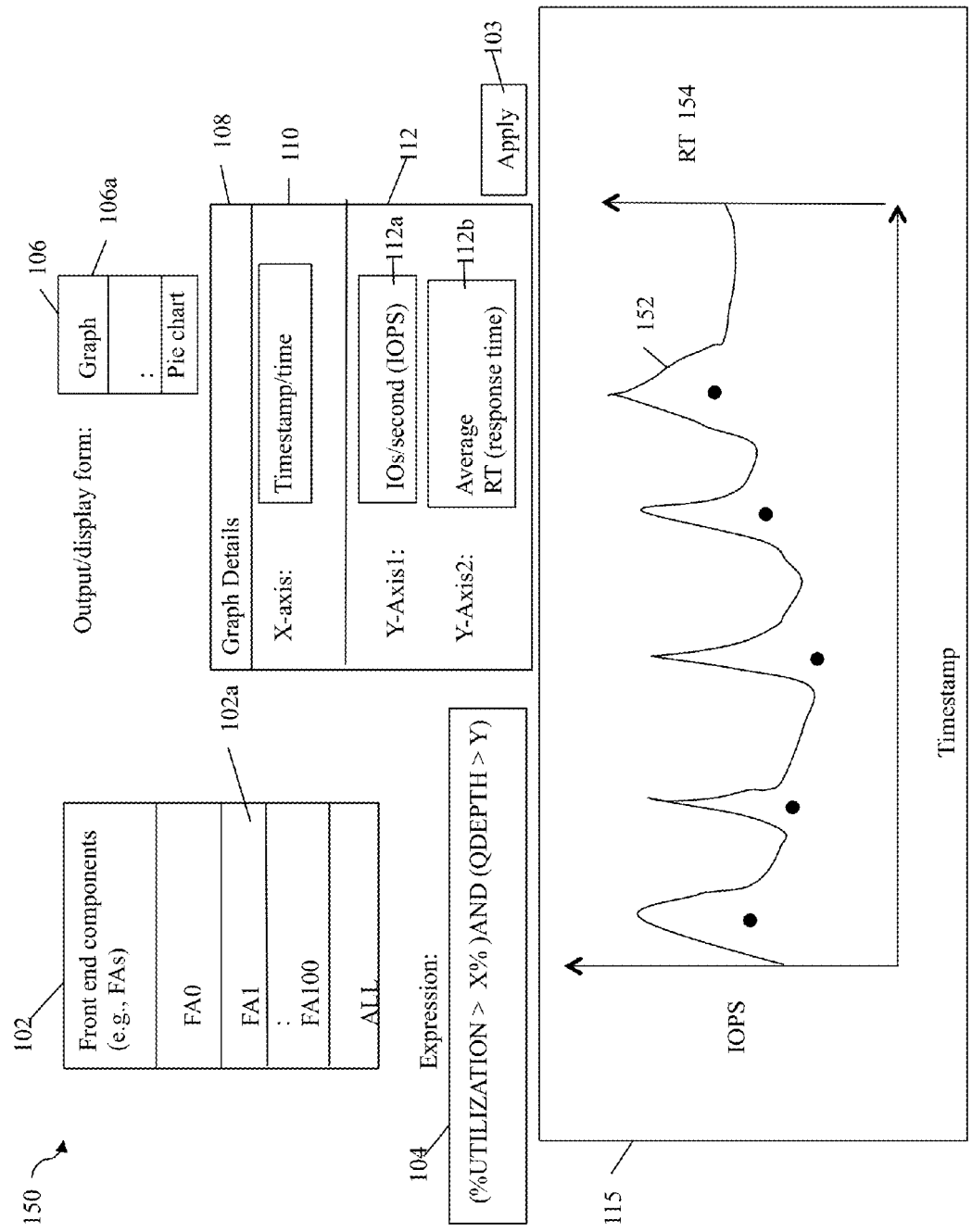

Referring to FIG. 3B, shown is an example 150 of elements that may be included in an updated user interface display in an embodiment in accordance with techniques herein. After the user has displayed the results as described in connection with the example 100, a user may now also wish to further view the average response time (RT) for I/Os received at FA1. Thus, a user may select to add a metric to the Y axis. The example 150 includes elements as described in connection with the example 100 with the difference that area 112 is now updated to include the second selected metric, RT, of the Y axis 112b. As known in the art, average RT may be defined as the average amount of time from the perspective of the data storage system perspective it takes to service an I/O operation. With respect to FA1, the selected RT metric may represent the average RT for I/Os of FA1 at each particular timestamp.

After updating area 112 to include the additional Y axis metric 112b, a user may select the apply button 103 thereby resulting in area 115 being updated. In this example, element 115 is updated to now include a second Y axis of response time (RT) 154 where curve 152 represents the various average RTs for FA1 correlated with the particular timestamps of the X axis. In this manner, a user may visualize the I/O rate (IOPS or I/Os per second) and correlating high RTs for the different points P1-P5 for FA1 when the expression in 104 evaluates to true.

In one aspect, the expression 104 may be characterized as identifying data filtering criteria specified by a user. Thus, a user is able to define such complex expressions using the interface provided in an embodiment in accordance with techniques herein. In one embodiment, the interface may allow a user to generally define an expression via text/typing input, via menu selections, and/or some combination of the foregoing.

Figure 3C:
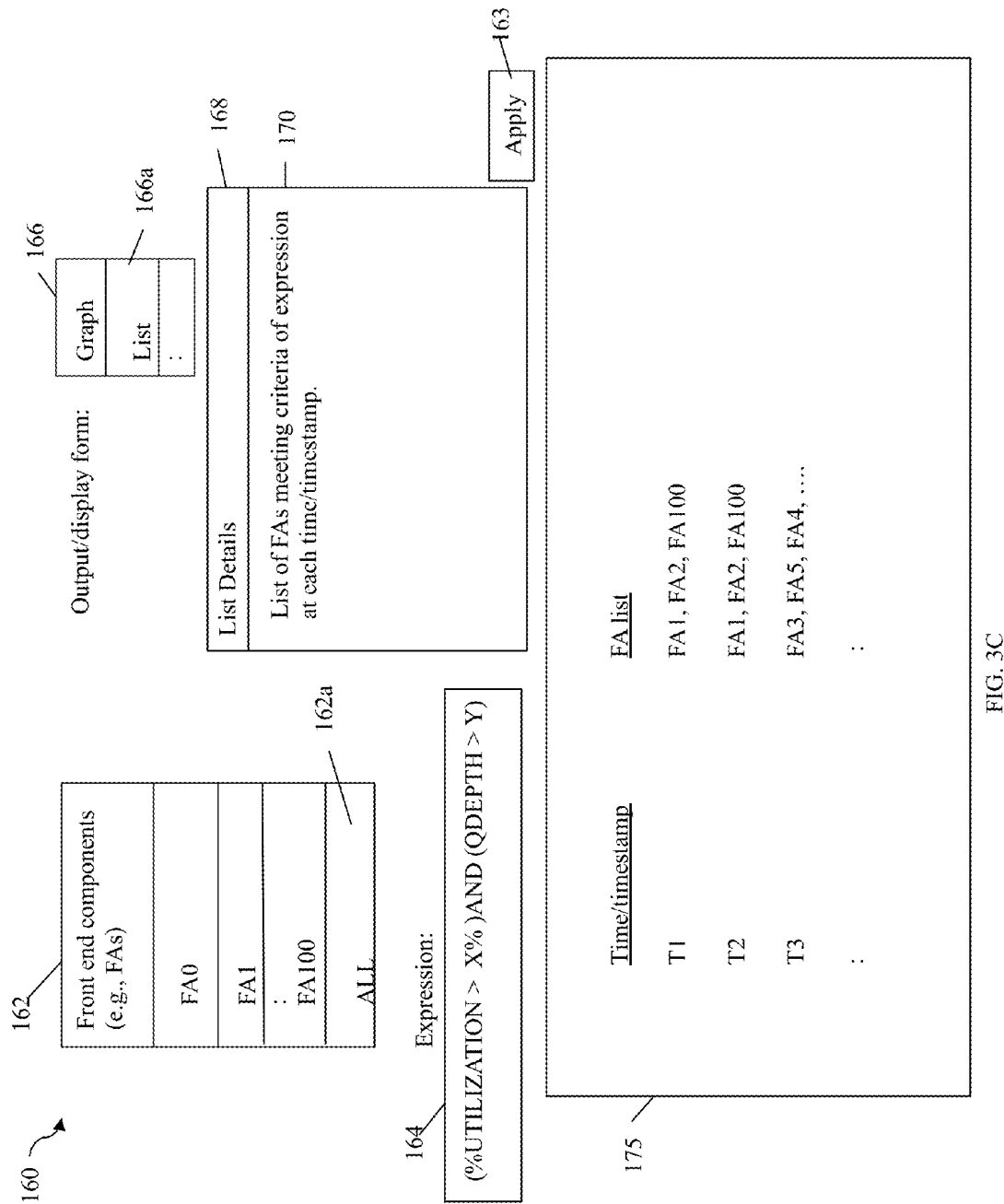

Referring to FIG. 3C, shown is another example 160 of elements that may be included in a user interface display in an embodiment in accordance with techniques herein. The example 160 illustrates elements that may be displayed in a user interface in connection with selecting a component of the data storage system, defining an expression, and then displaying results data in accordance with the selected component and defined expression. As described below, element 162 may be used to select the particular component, element 164 may be used in connection with defining an expression, element 166 may be used in connection with specifying the format of the displayed results, and element 168 may be used to identify the particular results data displayed. The example 160 includes a list 162 of front end components of the data storage system as described above in connection with 102. In this example, a user may select all FAs 162a.

The user interface 160 may include an area 164 where a user may define an expression whereby some specified result data (described below) is to be displayed for occurrences where the expression 164 evaluates to true. Element 164 is similar to 104 described above.

The user interface may also include a menu 166 from which a user may select a particular output or display form. Generally, menu 166 may be similar to 106 as described above. In this example a user may select a list 166a as the output or display form. Element 168 may be an area in which a user may select the particular details of the list. In this example 170, there may not be any selectable options but rather the list may simply be the list of FAs meeting the expression criteria at each time/timestamp.

Once the user has made various selections and inputs in connection with 162, 166 and 168, a user may then select the apply button 163 to apply the selected inputs to the collected data and display the desired results or output in area 175. Thus, area 175 may be updated to include the illustrated list in response to selection of 203. In this example, 115 illustrates a list of FAs at each time/time stamp point where each FA in the list has an associated % UTILIZATION greater than X % and an associated QDEPTH greater than Y (e.g. causing the expression of 164 to evaluate to true) at the point in time denoted by the timestamp.

Figure 4:
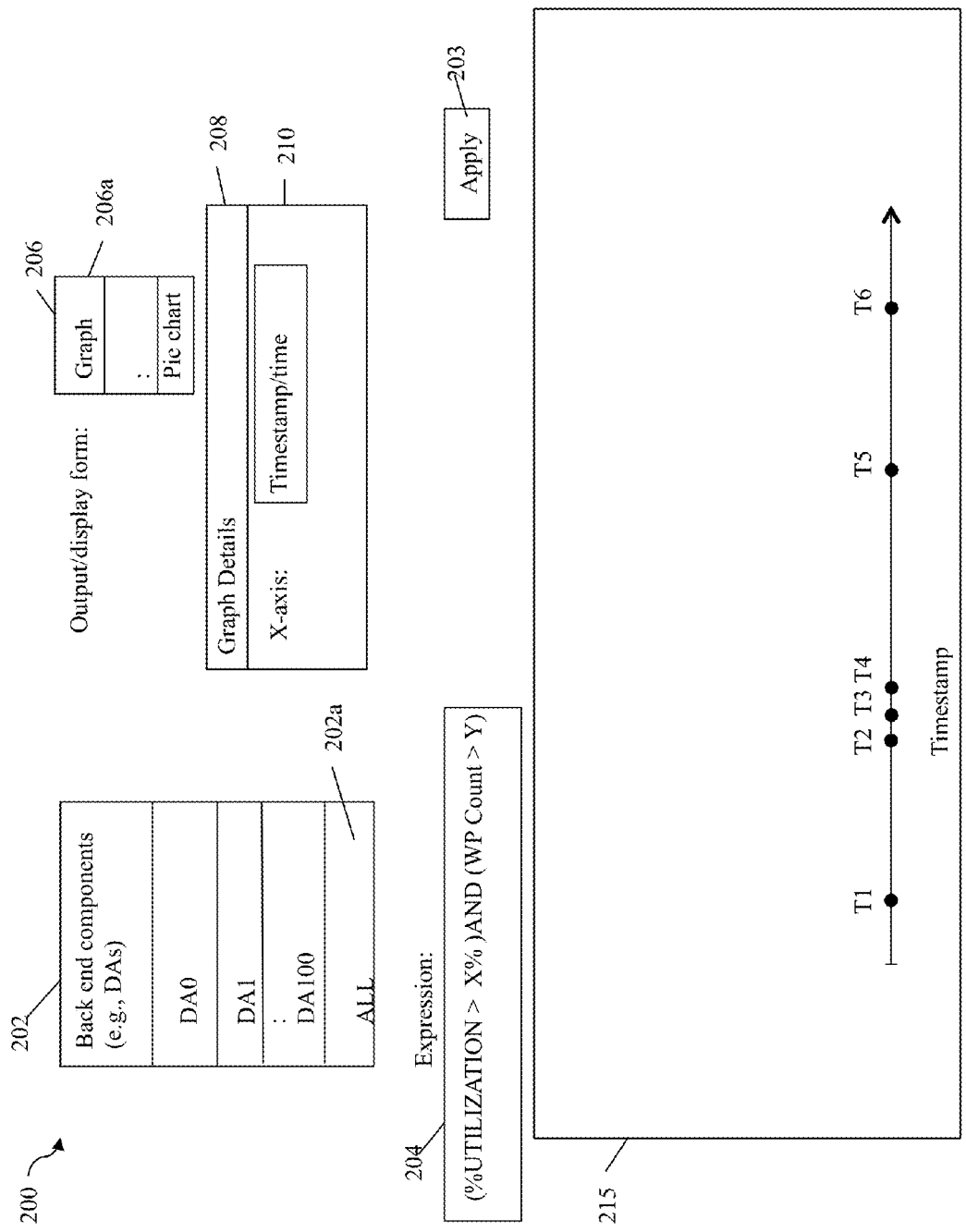

What will now be described in connection with FIG. 4 is an example illustrating use of DA filtering criteria whereby a graph may be viewed as a result of the filtering that shows only periods of time when a DA's % utilization is larger than a specified threshold X and also when the DA's write pending (WP) count is greater than a specified threshold Y. The foregoing filtering criteria may be used in connection with filtering the collected data for troubleshooting analysis. For example, a problem may be identified when both of the foregoing metrics are exceeded for a DA. The DA may be busy (e.g., so that its utilization percentage is larger than X) but such a level of busyness or utilization may not be expected to also adversely impact the pending write operations as denoted when the same DA's WP count is also greater than the threshold Y. For example, if such an expression whereby a DA's % utilization is larger than a specified threshold X and also the DA's write pending (WP) count is greater than a specified threshold Y, evaluates to true, it may indicate that the DA is overloaded and cannot handle the current workload for the particular physical device's serviced by the DA. It may indicate, for example, a need to redistribute the DA's workload such as, for example, by relocating one or more of the particular LUNs having their data stored on physical devices serviced by this DA to other physical devices serviced by other DAs.

Referring to FIG. 4, shown is another example of elements that may be included in a user interface display in an embodiment in accordance with techniques herein. The example 200 illustrates elements that may be included in an interface to display periods of time when DA % utilization is larger than a particular threshold X % (where X % may be as described above) and when DA write pending (WP) count is also greater than threshold Y (Y being an integer equal to or greater than zero).

As described below, element 202 may be used to select the particular component(s), element 204 may be used in connection with defining an expression, element 206 may be used in connection with specifying the format of the displayed results, and element 208 may be used to identify the particular data displayed.

The example 200 includes a list 102 of back end components of the data storage system. Such back end components in this example may include the various DAs that access the physical storage devices such as in connection with reading and writing data stored thereon for servicing I/O operations. A user may select one or more particular DAs from the list 202. In this example, a user may select all DAs 202a, or one or more particular DAs from the list 202.

The user interface 200 may include an area 204 where a user may define an expression whereby some specified result data (described below) is to be displayed for occurrences where the expression 204 evaluates to true. In this example, the expression may be input into area s04 via typing in a text format as described above in connection with 104. An embodiment may include a set of defined metrics and operations and the user may input an expression in accordance with a defined syntax that may vary with embodiment. In this example, defined metrics may include % UTILIZATION (as described above) and may also include WP Count (Write pending count). WP Count may be an integer value denoting a number of pending writes for a particular DA.

In this example, a user may enter an expression in area 204 which indicates to display specified result data (described below) when % UTILIZATION is greater than the specified threshold X % and also when the WP Count is greater than the specified threshold Y.

The user interface may also include a menu 206 from which a user may select a particular output or display form. Generally, menu 206 may be as described above in connection with 106. In this example a user may select graph 206a as the output or display form.

Element 208 may be an area in which a user may select the particular metrics of the one or more axis of the graph similar to that as described above in connection with element 108. In this example, 210 indicates that the X-axis metric includes the timestamps or various times of the associated collected data, with no Y-axis. Thus, in this example, a graph is displayed of various timestamps for which any of the selected DAs have a % UTILIZATION greater than X % AND WP count that is also greater than Y.

Once the user has made various selections and inputs in connection with 202, 206 and 208, a user may then select the apply button 203 to apply the selected inputs to the collected data and display the desired results or output in area 215. Thus, area 215 may be updated to include the illustrated graph in response to selection of 203. In this example, 215 illustrates 5 points T1-T5 denoting the associated times/timestamps at which any DA has % UTILIZATION and WP count that result in the expression 204 evaluating to true. For example, if there are a total of 3 DAs, a point is displayed at a particular time/timestamp where at least one of the DAs has a % UTILIZATION and WP count that result in the expression 204 evaluating to true.

As illustrated, for example, with reference to 102, 162 and 202 of above-mentioned figures, an embodiment may provide user interface elements from which a user may select one or more components for which collected data (e.g., performance data and/or workload data) is filtered by applying an expression forming the filtering criteria. Described in following figures are further examples of lists of components that may be used in a similar manner in an embodiment in accordance with techniques herein. Additionally, following figures illustrate another way in which metrics relevant to a particular component may be displayed for selection in connection with forming an expression, or more generally, filtering criteria applied to the collected data for the selected components.

Figure 5:
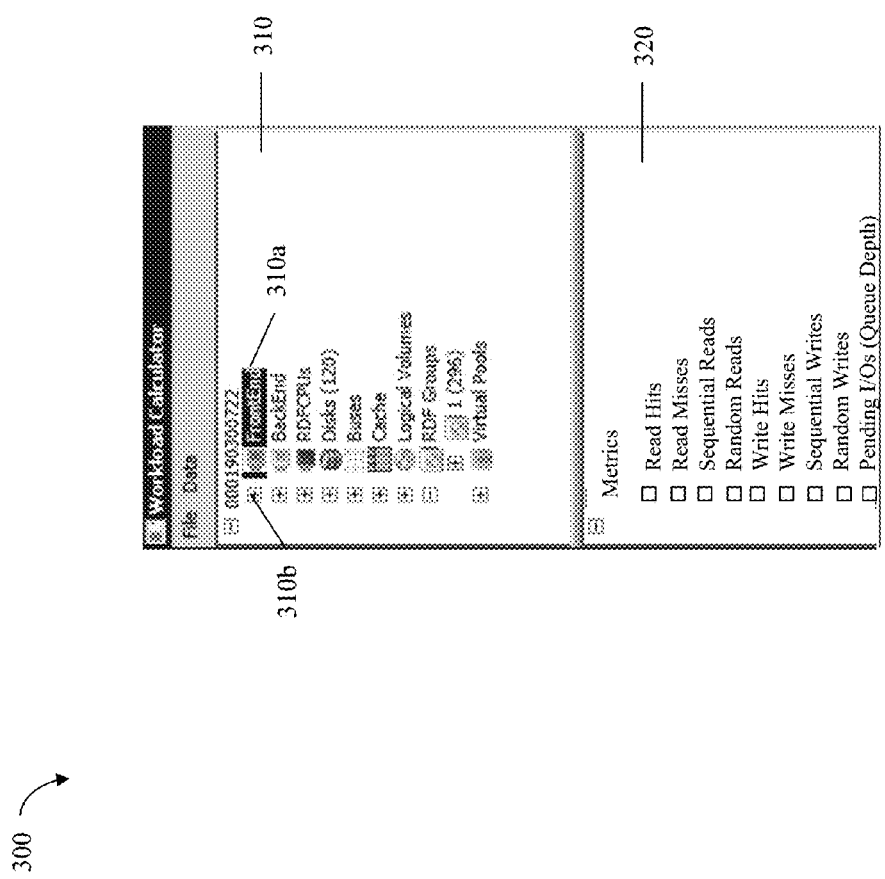

Referring to FIG. 5, shown is an example 300 of lists that may be included in a user interface in an embodiment in accordance with techniques herein. The example 300 includes a first list of component categories displayed in area 310 and a second list of metrics 320 that may vary with the particular selected component category selected in area 310.

Area 310 includes the following component categories: Front end or FAs, Back end or DAs, RDFCPUs (e.g., RAs or other CPU components used in connection with a remote data facility (RDF)), Disks (e.g., physical storage devices more generally), Buses, Cache, Logical Volumes or LUNs, RDF Groups, and virtual pools. An embodiment of a data storage system may include any number of components in each of the foregoing categories. In the foregoing, RDF may denote the Remote Data Facility by EMC Corporation which provides for automated remote replication of data, such as one or more LUNs, from a first data storage system to a second data storage system. With RDF, a host may issue a command, such as to write data to device R1 of data storage system. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Remote Data Facility (RDF) product provided by EMC Corporation of Hopkinton, Mass. Data storage device communication between Symmetrix® data storage systems using RDF is described, for example, in U.S. Pat. Nos. 5,742,792 and 5,544,347, both of which are incorporated by reference herein. With RDF, a user may denote a first local storage device, such as R1 and a second remote storage device, such as R2. The host may interact directly with the device R1 of a first data storage system where any data changes made to R1 are automatically provided to the R2 device of a second remote data storage system using RDF. In operation, the host may read and write data using the R1 volume, and RDF may handle the automatic copying and updating of data from R1 to R2 in the second data storage system. In the foregoing, an RDF group may identify a group of LUNs for which RDF services are performed. For example, an RDF group may identify a set of R1 and R2 devices (e.g., LUNS) for which RDF automated data mirroring are performed. RDF groups are described, for example, in U.S. Pat. No. 6,910,075, which is hereby incorporated by reference. A virtual pool may define a group of multiple storage devices which operate as a collective pool from which storage may be provisioned.

Selection of a particular component category, such as front end 310a, may result in the display area 320 being updated to include the relevant defined metrics for the currently selected component category. Such defined metrics may generally represent different aspects or measurements of the workload for the particular component category. It should be noted that selection of the plus "+" sign 310b preceding the particular category may result in expansion of the selected front end category where a list of existing FAs may be displayed. In connection with component selection, a user may select one or more particular FAs from the displayed list or otherwise select the category (thereby denoting selection of all FAs) to identify those components having collected data to which the filtering criteria is applied.

In this example, area 320 includes metrics that may be defined in a data storage system for use with different FAs in accordance with techniques herein. The metrics for FAs may include: read hits (read hit rate (reads/second) for reads resulting in cache hit), read misses (read hit rate (reads/second) for reads resulting in cache miss), sequential reads (sequential read hit rate (reads/second) for reads which are sequential), random reads (random read hit rate (reads/second) for reads that are random or non-sequential), write hits (write hit rate (writes/second) for writes resulting in cache hit where current write data overwrites existing WP data in cache), write misses (write miss rate (writes/second) for writes resulting in write miss where current write data is stored in new cache entry and marked as WP to be destaged), sequential writes (write rate (writes/second) for writes which are sequential, random writes (write rate (writes/second) for writes which are random or non-sequential), number of pending I/Os (this metric may denote the queue depth as an average, at a point in time, and the like). Collectively, the sequential reads (or sequential read rate) and random reads (or random read rate) may denote a total number of reads (or total read rate). Similarly, the sum of sequential writes (or sequential write rate) and random writes (or random write rate) may denote a total number of writes (or total write rate). An embodiment may also include defined metrics for the foregoing sum rates as well (e.g, read rate denoting the average number of reads/second for all types of reads, write rate denoting the average number of writes/second for all types of writes overall average I/O rate denoting the average number of I/Os per second for all I/O operation types (e.g., both reads and writes)). In the display 320, metrics that may be defined for FAs which are rates such as noted above may be expressed in terms of I/Os per second or IOPS. Although not included in 320, the metrics for FAs may also include one or more metrics related to response time (RT), the size of the I/Os, and the like. For example, as related to I/O size, such metrics may include an average I/O size (for all I/Os), average read I/O size (average I/O size for reads), average write I/O size (average I/O size for writes), as well as averages for the different types of reads and writes (e.g., sequential, non-sequential or random). Such sizes may be expressed in any suitable size unit, such as bytes, Kbytes, and the like.

The area 320 in this example may include the predefined metrics listed. Additionally, as described elsewhere herein, a user may define and save one or more of his/her own metrics with a user-defined expression. In such an embodiment, the list displayed in area 320 may also include any such user-defined metrics. For example, with reference to element 104 of FIG. 3A, a user may define a customized metric, such as METRIC1, equal to the expression in 104. Such an assignment to a user-defined metric METRIC1 may be performed in any suitable manner. For example, the user interface may include further controls and options to define and save the expression in 104 as a newly defined user metric METRIC1. In this case, the area 320 may also include the user-defined metric such as METRIC1.

To further illustrate user-defined metrics, consider the following. In one embodiment, for use with a selected component, predefined metrics may include the total read rate denoting a total number of read I/Os per second and a sequential read rate (denoting a number of sequential reads per second). However, the embodiment may not have a predefined metric of the random read rate (denoting a number of random reads per second). In this case, a user may define an expression of "total read rate−sequential read rate" and assign such an expression to a user defined metric, RANDOM_READ_RATE, to denote the random read rate. The user may refer to and utilize the user defined metric RANDOM_READ_RATE in forming subsequent expressions in a manner similar to predefined metrics.

As illustrated, for example, with reference to 102, 162 and 202 of above-mentioned figures, various components may be selected from 310 to identify those components for which collected data (e.g., performance data and/or workload data) is filtered. Rather than entering an expression including metrics in a free-form manner via text input such as described in connection with above-mentioned figures, an embodiment may provide other means by which filtering criteria included in expressions may be selected. In one embodiment, a user may select the filtering criteria included in an expression, such as selecting one or more metrics or properties, from items displayed in 320.

Figure 6:
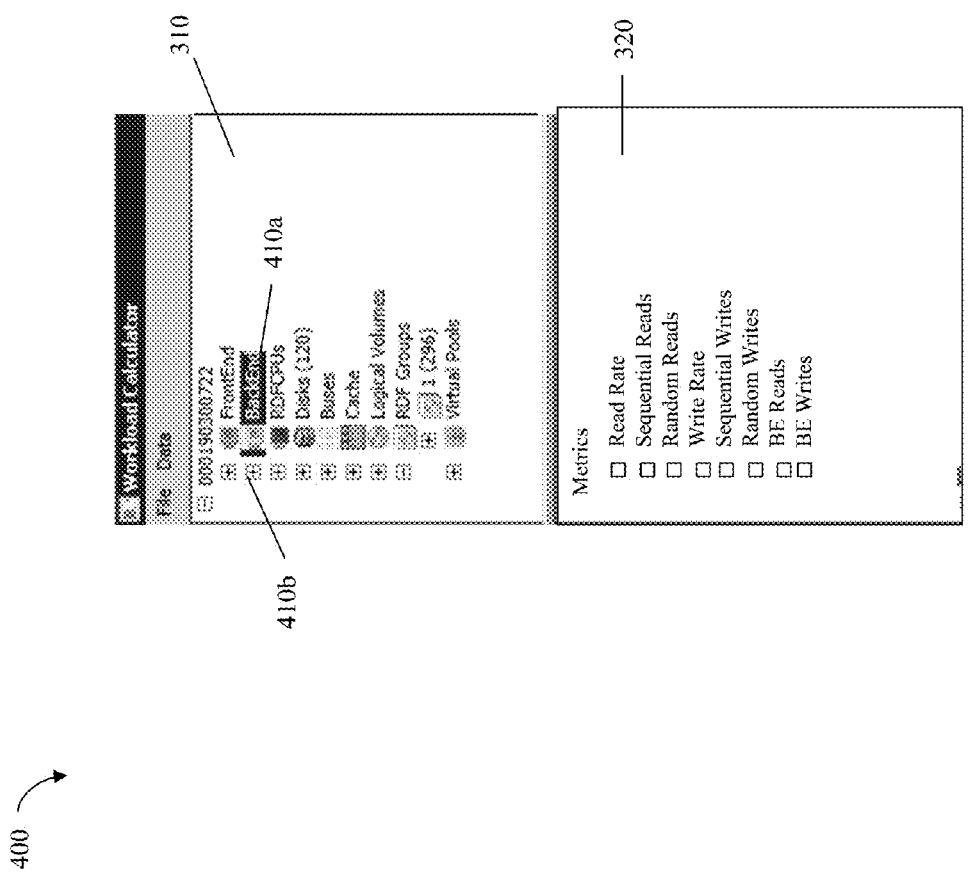

With reference now to FIG. 6, in a similar manner to that described above for 310*a*, selection of another category such as backend 410*a* causes the area 320 to be accordingly updated to include the relevant defined metrics for the currently selected component category of backend or DA.

As will be appreciated by those skilled in the art, the reads for DA only denotes read misses and thus such metrics available to the DAs accordingly only relate to read misses. In this example, area 320 includes metrics that may be defined in a data storage system for use with different DAs in accordance with techniques herein. The metrics for DAs may include: read rate (reads/second for reads resulting in cache miss), sequential reads (sequential read rate (reads/second) for reads which are sequential), random reads (random read hit rate (reads/second) for reads that are random or non-sequential), write rate (writes/second), sequential writes (write rate (writes/second) for writes which are sequential), random writes (write rate (writes/second) for writes which are random or non-sequential), BE reads (backend or DA-read rate (reads/second)), and BE writes (backend or DA write rate (writes/second)). Collectively, the sequential reads (or sequential read rate) and random reads (or random read rate) may denote a total number of reads (or total read rate) as represented by read rate. Similarly, the sum of sequential writes (or sequential write rate) and random writes (or random write rate) may denote a total number of writes (or total write rate) as denoted by write rate. BE reads and BE writes may denote, respectively, reads and writes performed by the back end components without using the FAs (e.g., I/Os causing the read or write of data do not go through the FE). For example, such BE reads and writes may relate to various operations such as creating a snapshot, mirror, or backup, moving data between physical devices such as due to data storage movement optimizations which relocate data on various physical devices to balance load or otherwise optimize performance, and the like.

In the display 320, metrics that may be defined for DAs which are rates such as noted above may be expressed in terms of I/Os per second or IOPS. Although not included in 320, the metrics for DAs may also include average RT, an overall average I/O rate denoting the average number of I/Os per second for all I/O operation types (e.g., both reads and writes)), and one or more metrics related to the rate of data transfer (e.g., Kbytes/second for all reads and writes), read transfer rate (e.g., Kbytes/second read), and write transfer rate (e.g., Kbytes/second of data written).

The area 320 in this example may include the predefined metrics listed. Additionally, as described elsewhere herein, a user may define and save one or more of his/her own metrics with a user-defined expression. In such an embodiment, the list displayed in area 320 may also include any such user-defined metrics. For example, with reference to element 204 of FIG. 4, a user may define a customized metric, such as METRIC2, equal to the expression in 204. Such an assignment to a user-defined metric METRIC2 may be performed in any suitable manner. For example, the user interface may include further controls and options to define and save the expression in 204 as a newly defined user metric METRIC2. In this case, the area 320 may also include the user-defined metric such as METRIC2 for DAs.

It should be noted that selection of the plus "+" sign 410*b* preceding the particular category may result in expansion of the selected front end category where a list of existing DAs may be displayed. In connection with component selection, a user may select one or more particular DAs from the displayed list or otherwise select the category (thereby denoting selection of all DAs) to identify those components having collected data to which the filtering criteria is applied.

As illustrated, for example, with reference to 102, 162 and 202 of above-mentioned figures, various components may be selected from 310 to identify those components for which collected data (e.g., performance data and/or workload data) is filtered. Rather than entering an expression including metrics in a free-form manner via text input such as described in connection with above-mentioned figures, an embodiment may provide other means by which filtering criteria included in expressions may be selected. In one embodiment, a user may select the filtering criteria included in an expression, such as selecting one or more metrics or properties, from items displayed in 320.

Figure 7:
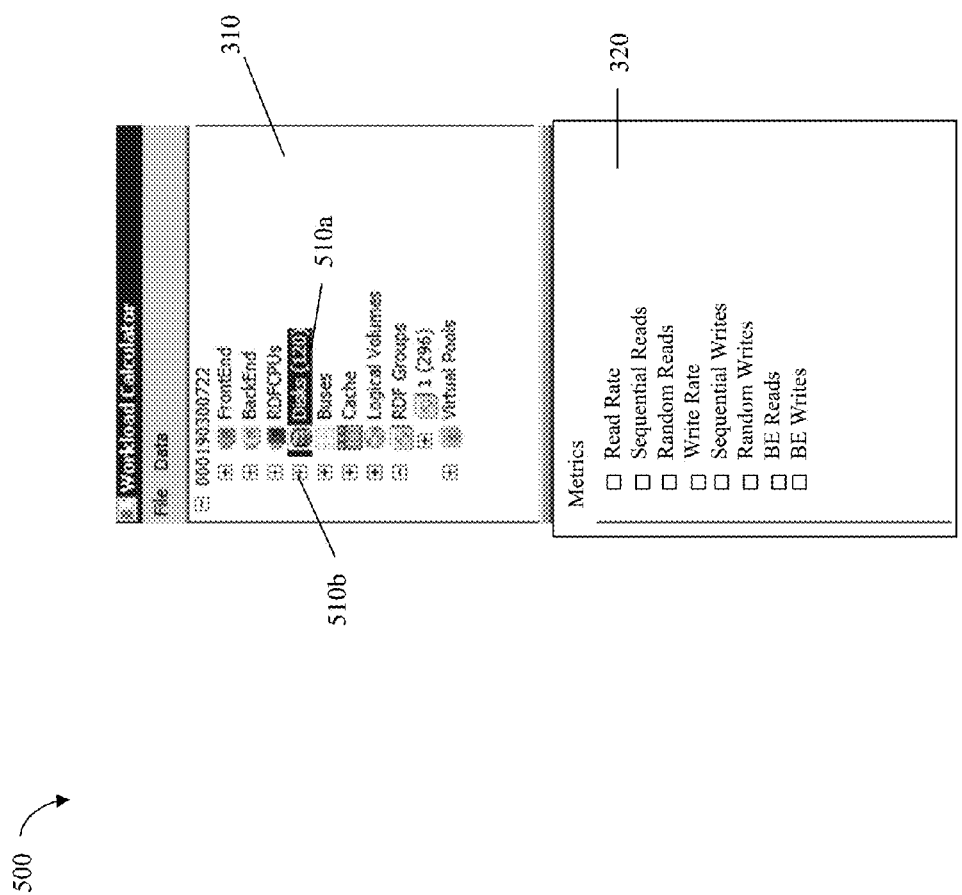

With reference now to FIG. 7, in a similar manner to that described above for 310*a* and 410*a*, selection of another category such as disks 510*a* causes the area 320 to be accordingly updated to include the relevant defined metrics for the currently selected component category of disks, or more generally, physical storage devices.

In this example, area 320 includes metrics that may be defined in a data storage system for use with different disks or physical storage devices in accordance with techniques herein. The metrics for disks as displayed in 320 may include those as described in connection with FIG. 6 for DAs.

It should be noted that selection of the plus "+" sign 510*b* preceding the particular category may result in expansion of the selected front end category where a list of existing disks may be displayed. In connection with component selection, a user may select one or more particular disks from the displayed list or otherwise select the category (thereby denoting selection of all disks) to identify those components having collected data to which the filtering criteria is applied.

As illustrated, for example, with reference to 102, 162 and 202 of above-mentioned figures, various components may be selected from 310 to identify those components for which collected data (e.g., performance data and/or workload data) is filtered. Rather than entering an expression including metrics in a free-form manner via text input such as described in connection with above-mentioned figures, an embodiment may provide other means by which filtering criteria included in expressions may be selected. In one embodiment, a user may select the filtering criteria included in an expression, such as selecting one or more metrics or properties, from items displayed in 320.

Figure 8:
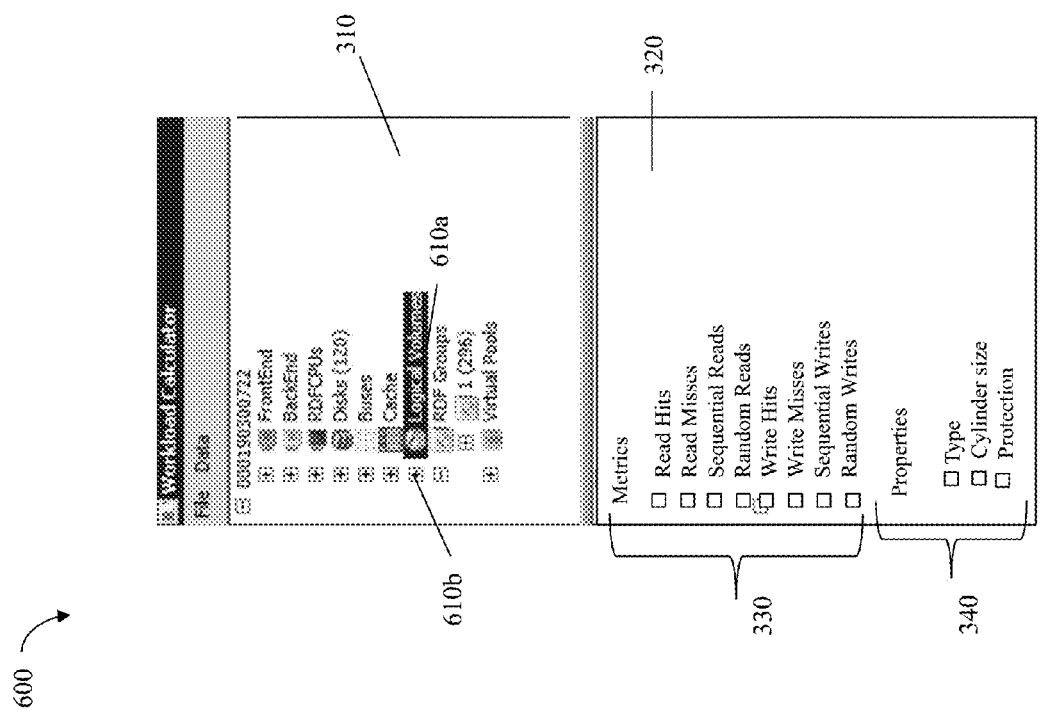

With reference now to FIG. 8, in a similar manner to that described above for 310a, 410a and 510a, selection of another category such as logical volumes 610a causes the area 320 to be accordingly updated to include the relevant defined metrics for the currently selected component category of logical volumes.

In this example, area 320 includes metrics 330 that may be defined in a data storage system for use with logical devices in accordance with techniques herein. The metrics for logical devices as displayed in 320 may include those as described in connection with FIG. 5 for FAs or front end components with the difference that such metrics are with respect to selected logical volumes. Additionally, although not illustrated in FIG. 8, an embodiment may include other metrics such as related to prefetched data. In one embodiment, data prefetching may be implemented when reading data from physical storage. As known in the art, data prefetching may be performed in response to detection of sequential read patterns. A sequential read pattern may be detected, for example, when multiple consecutive read operations result in sequentially reading a set of logically contiguous data. For example a first read operation may read data from LUN X, LBA 1-3 and a second read operation may read data from LUN A, LBA 4-6. Upon receiving the second read operation, a sequential read pattern may be detected. Prefetching may be performed in response to detecting a sequential read pattern since it is likely that such sequential pattern of reading data may continue in subsequent not yet received read operations. In this manner, when retrieving the read data for LUN A, LBA 4-6 of the second read operation, additional data of the sequential pattern may also be prefetched beyond what is currently requested. For example, LUN A, LBA 7-8 may be prefetched even though such data has not been requested for a read operation. Such prefetching may be characterized as a predictive heuristic allowing for prefetching of data from the physical device prior to such data actually being requested. In this manner, the cache may be prepopulated with prefetched data (next expected sequential data in the detected pattern) prior to actually receiving the subsequent read request for the prefetched data in order to increase performance and reduce the response time for servicing requests. Thus, an embodiment in accordance with techniques herein may implement prefetching and may also detect a sequential read. For example, a sequential read pattern may be detected in connection with the read request for data and prefetching may be performed to obtain the next sequential data in the detected sequential read pattern prior to actually receiving a request to read such prefetched data. Thus, an embodiment may include metrics such as related to an amount of prefetched data, an average rate at which data is prefetched, a prefetch hit ratio denoting an average percentage of the prefetched data that was actually subsequently requested thereby resulting in a read cache hit, and the like.

Additionally, the area 320 may include relevant properties 340 for logical volumes. Generally, the area 320 may display filtering criteria that may be used in connection with defining expressions to analyze and filter through the collected data. For some component categories such as logical volumes, properties may be included as additional filtering criteria (in addition to the metrics of 330). Such properties may also be selected for use in defining expressions as will be described in more detail below. The properties 340 for logical volumes may include a logical volume type, cylinder size and protection. A logical volume may have an associated type property related to its particular use. For example, a logical volume used for typical data storage may be a standard type. Other types may include, for example, RDF if the logical volume is an R2 device for another R1 device in another remote data storage system. The cylinder size property may relate to a volume parameter or geometry and may denote the number of sectors per cylinder. The protection property of 340 may denote a particular RAID protection level, if any, provided for data of a selected logical volume. As known in the art, physical devices may be configured into a RAID group having a selected RAID protection level such as RAID-1, RAID-5, RAID-6 and the like. From such RAID groups of a particular RAID level, LUNs or logical volumes may be configured whereby the protection associated with the logical volume may denote the RAID level of the underlying RAID group.

It should be noted that selection of the plus "+" sign 610b preceding the particular category may result in expansion of the selected front end category where a list of existing logical volumes may be displayed. In connection with component selection, a user may select one or more particular logical volumes from the displayed list or otherwise select the category (thereby denoting selection of all logical volumes) to identify those components having collected data to which the filtering criteria is applied.

With reference to 102, 162 and 202 of above-mentioned figures, various components may be selected from 310 to identify those components for which collected data (e.g., performance data and/or workload data) is filtered. Rather than entering an expression including metrics in a free-form manner via text input such as described in connection with above-mentioned figures, an embodiment may provide other means by which filtering criteria included in expressions may be selected. In one embodiment, a user may select the filtering criteria included in an expression, such as selecting one or more metrics or properties, from items displayed in 320. Following is another example illustrating selection of filtering criteria in connection with an interactive dialogue and lists of items in an embodiment in accordance with techniques herein.

Although FIGS. 5-8 illustrate particular categories, it should be noted that an embodiment may provide similar functionality for other categories of 310 (e.g., to display a list of existing components of a particular category when selected, display relevant metrics or other filtering criteria for the selected category or component, and the like).

Figure 9:
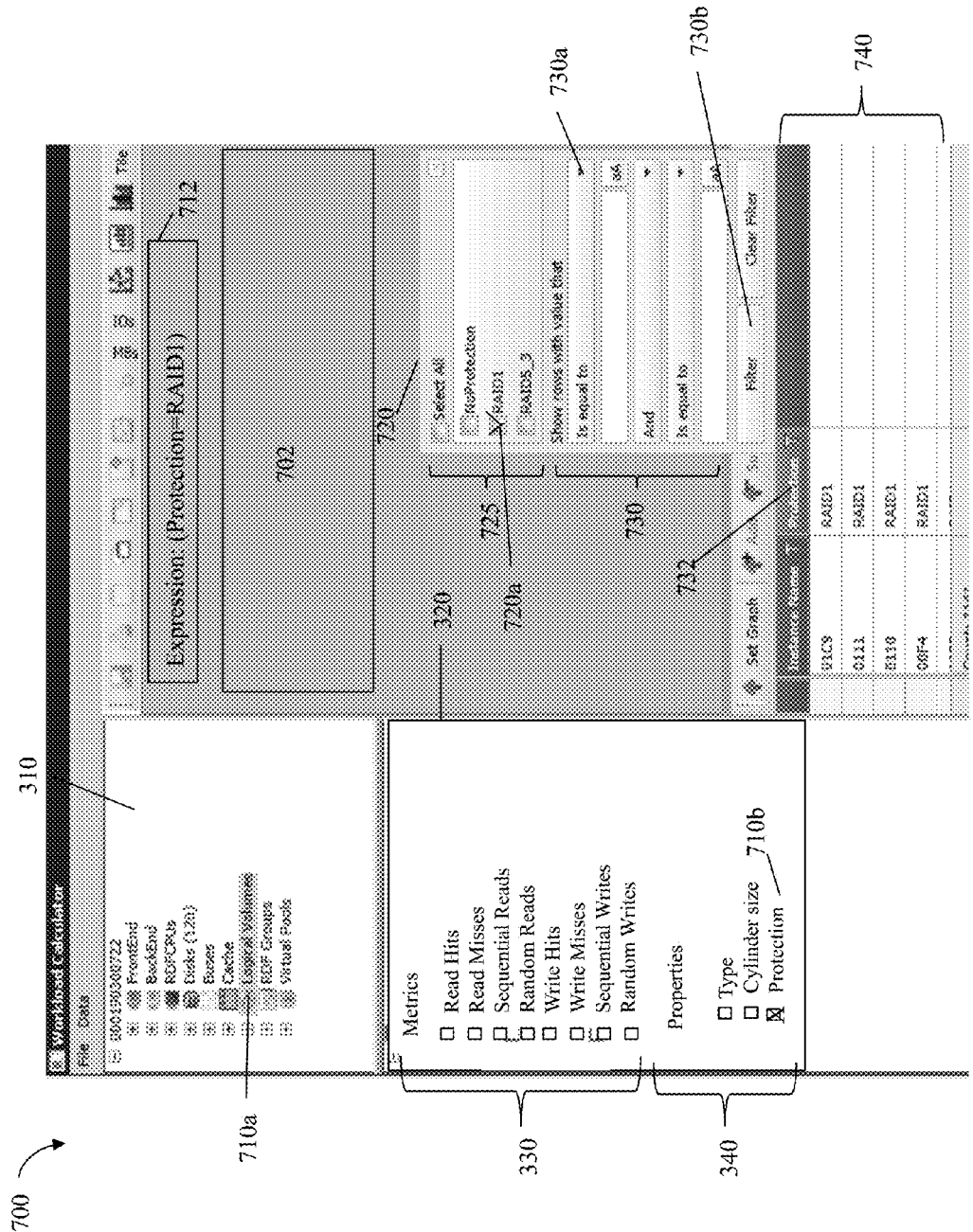

Referring to FIG. 9, shown is another example of elements of a user interface in an embodiment in accordance with techniques herein. The example 700 illustrates selection of filtering criteria via an interactive dialogue and lists of items in an embodiment in accordance with techniques herein.

As a first step, a user may select item 710a to select all logical volumes. In response, the area 320 may be updated to include various filtering criteria, such as metrics and properties, applicable for use with the selected logical volumes component category. It should be noted that 320 of FIG. 9 may include items similar to that as described above in connection with FIG. 8. Additionally, in response to selecting 710a, area 740 may be updated to list all logical volumes selected.

As a second step, a user may then select one or more items from 320 included in the filtering criteria used to filter the collected data for the logical volumes. In this example, a user may select protection 710b. In response to selecting 710b, the display area 740 may be further updated to include only the protection property for each logical volume listed. As a variation, if a user had also selected from 330 one of the metrics such as read hits and also selected from 340 the type property, values for the reads hits metric value (such as an average) and type property may also be displayed in area 740. Additionally, it should be noted that an embodiment may also select to graphically display the one or more metrics selected from 330 such as in a portion of area 702.

As a third step, a user may select the protection column header 732 from the display area 740. In response to selecting 732, another dialogue box 720 may be displayed allowing the user to further make selections for filtering criteria as related to the protection property. In particular, dialog box 720 includes an area 725 displaying protection type filtering criteria. In this example, the area 725 may include the particular RAID protection levels supported in an embodiment whereby a logical volume may have any one of the listed RAID levels of no protection (meaning the logical volume is not configured from storage of a RAID group and has no RAID level protection), RAID-1, and RAID-5. As a fourth step, a user may select RAID1 720a.

Additionally, dialog box 720 may include area 730 with different operations that may be applied in connection with the selected protection filtering criteria denoted by 725 of protection=RAID1. As a fifth step, a user may select the particular logical operation applied. In this example, the operation of "is equal to" may be selected 730a from a menu of possible supported operations. Thus, at this point, the user has selected filtering criteria which provides for displaying the protection type of all logical volumes having a protection=RAID1.

As a fifth step, a user may select the filter button 730b causing application of the selected filtering criteria to the collected data so that area 740 may be accordingly updated to identify logical volumes with protection=RAID1 and, for each such logical volume, to include in area 740 the selected property of protection (as identified via the selected metrics of 330 and/or selected properties from 340).

It should be noted that area 730 illustrates only a single operation of "is equal to". Although not illustrated in 700, the item 730a may be selected from a menu including other supported operations such as "is not equal to". Other operations that may be included are mentioned elsewhere herein and also known in the art. Additionally, an embodiment may include the operations in any suitable form. In the example 700, such operations may be expressed in English although an embodiment may alternatively use the symbolic form of the operations (e.g., use "=" rather than "is equal to").

The example 700 illustrates the use of an interactive dialogue providing particular filtering criteria suitable for the selected component category. A user may select filtering criteria as the user is presented with such criteria in a guided manner rather than have the user input an expression, such as via keyboard entry, in a free-form manner such as described in connection with FIG. 3A. The user selections illustrated in FIG. 9 may be used in an embodiment as an alternative, for example, to entering an equivalent filtering criteria expression such as "Protection=RAID1".

In one embodiment, the user interface may include an area 712 which may provide as an output the current expression of the filtering criteria formulated by the user selections.

It should be noted that the example 700 illustrates filtering criteria including an expression 712 with a single operator. However, an embodiment may include other menu options which also provide for building more complex expressions with multiple operators. For example, with reference back to element 104 of FIG. 3A, the expression 104 included in the filtering criteria uses two relational operators (two occurrences of >) and the logical AND operator. An embodiment may provide dialogues and menu selections so that a user may build such a complex expression of 104 in a manner similar to that as illustrated in connection with FIG. 9.

Figure 10:
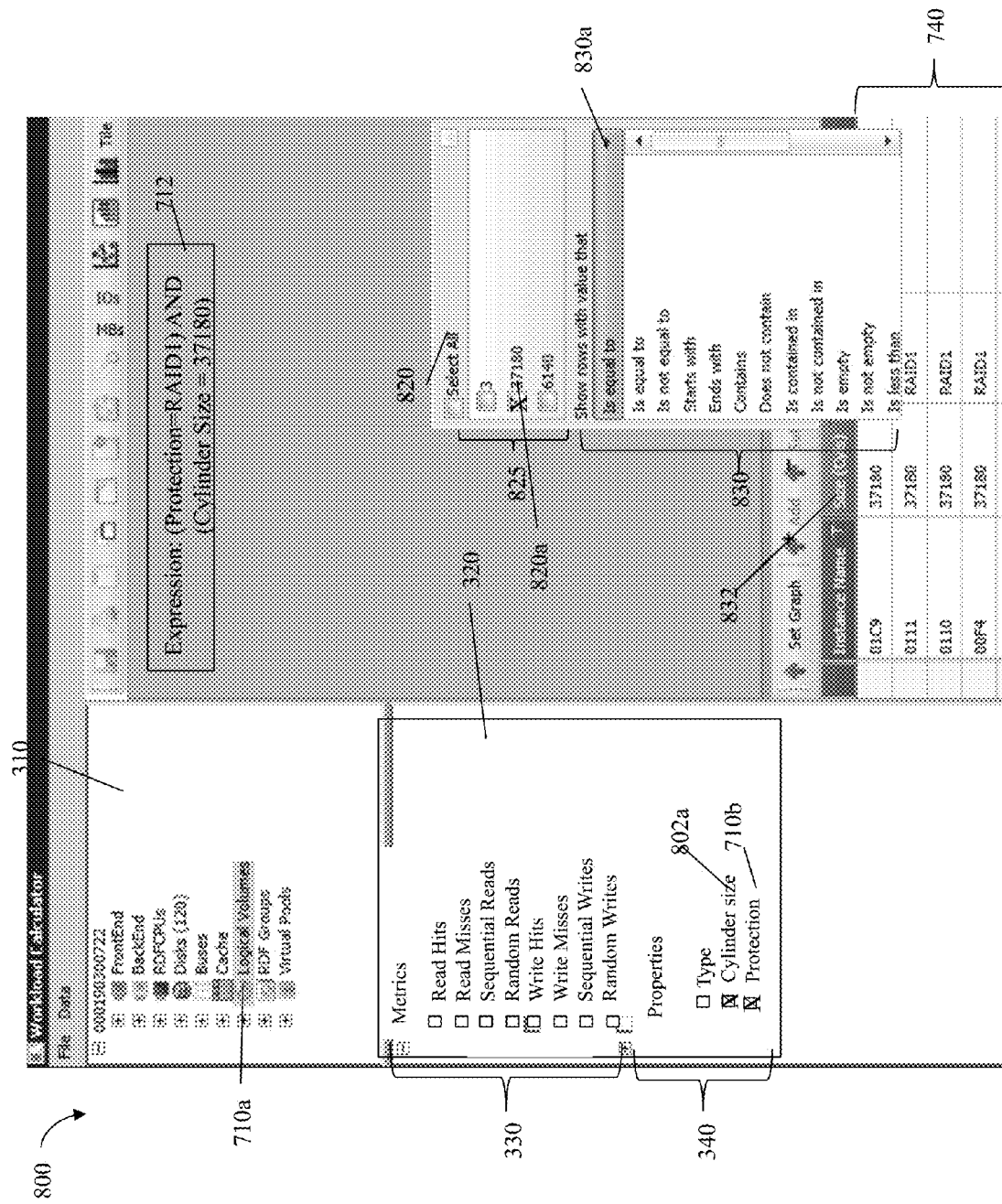

To further illustrate and continuing with the example of FIG. 9, reference is now made to FIG. 10. A user may have performed processing as described in connection with FIG. 9. The user may now continue with processing in connection with the user interface as will now be described in connection with the example 800. FIG. 10 includes elements similarly numbered as in FIG. 9. Additionally, in the example 800, a user may further specify additional filtering criteria. A user may select 802a cylinder size from the properties 340 thus specifying cylinder size as filtering criteria.

In response to selecting 802a, the display area 740 may be further updated to include both the protection property and cylinder size for each logical volume listed (e.g., column 832 of information for cylinder size is added in response to selecting 802a).

A user may then select the cylinder size column header 832 from the display area 740. In response to selecting 832, another dialogue box 820 may be displayed allowing the user to further make selections for filtering criteria as related to the cylinder size property. In particular, dialog box 820 includes an area 825 displaying cylinder size filtering criteria. In this example, the area 825 may include the particular cylinder sizes supported in an embodiment whereby a logical volume may have any one of the listed cylinder sizes of 3, 37180, and 6140. In this example, a user may select 820a to filter by cylinder size of 37180.

Additionally, dialog box 820 may include area 830 with different operations that may be applied in connection with the selected protection filtering criteria denoted by 825 of cylinder size of 37180. Element 830 illustrates operators that may be included in an embodiment and from which a user may select. A user may select the particular operation from 830 to be applied. In this example, the operation of "is equal to" may be selected 830a from the menu 830 of possible supported operations. Thus, at this point, the user has selected filtering criteria which provides for displaying the protection type and cylinder size of all logical volumes having a protection=RAID1 and a cylinder size=37180.

In a manner similar to that as described in FIG. 9, a user may select filter button 730b (view obscured in example 800 due to display of operators 830) causing application of the selected filtering criteria to the collected data whereby area 740 may be accordingly updated to identify logical volumes with protection=RAID1 and cylinder size=37180 and, for each such logical volume, to include in area 740 the selected properties of protection and cylinder size (as identified via the selected metrics of 330 and/or selected properties from 340).

Additionally, area 712 may be accordingly updated to reflect the currently selected filtering criteria. In the example 800, the expression 712 may be updated to include "AND (Cylinder Size=37180) based on the additional user selections made in connection with the example 800.

The logical operator AND may be specified as the default logical operation performed when joining multiple relational operations. However, an embodiment may provide any one or more other suitable ways to select a logical operation. For example, an embodiment may additionally prompt the user with another dialog box to select one of multiple logical operators to be applied, allow the user to subsequently edit the automatically generated expression in 712 (e.g., to modify AND to another logical operation such as OR), and the like.

What will now be described is another example illustrating use of techniques herein with a division operation whereby, for one or more selected logical volumes, the read throughput or read data transfer rate (e.g., Kbytes/second) is divided by the read rate (e.g., reads/second) to obtain the average I/O size for the selected logical volume.

Figure 11A:
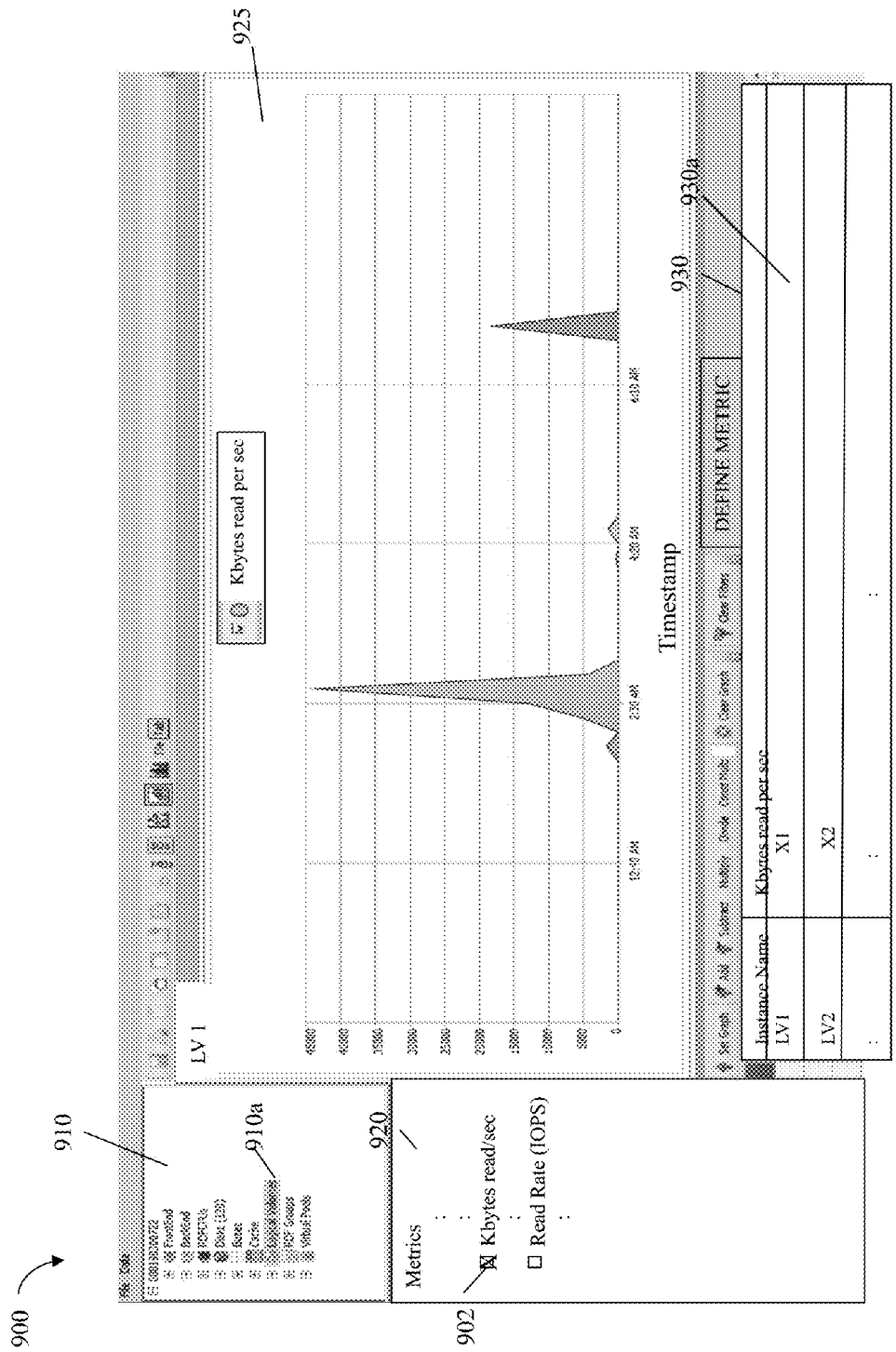

Referring to FIG. 11A, shown is another example 900 of elements of a user interface in an embodiment in accordance with techniques herein. The example 900 includes an area 910 in which a user may select 910a the component category logical volumes as described above. In response to selection 910a, area 920 may be updated to include relevant metrics for the selected component category logical volumes as described above. In this example, the logical volume metrics of 920 may include read throughput or data transfer rate denoted as Kbytes read/sec(ond), and read rate (which is the read IOPS or read I/Os per second). Area 930 may be updated to include the selected metric 902 of Kbytes read/second for all logical volumes. A user may select a particular logical volume, such as LV1 930a, by selecting a row of the displayed information in area 930. In response to selection 930a, area 925 may be updated to graphically display the selected metric Kbytes read/second for the selected LV1.

Figure 11B:
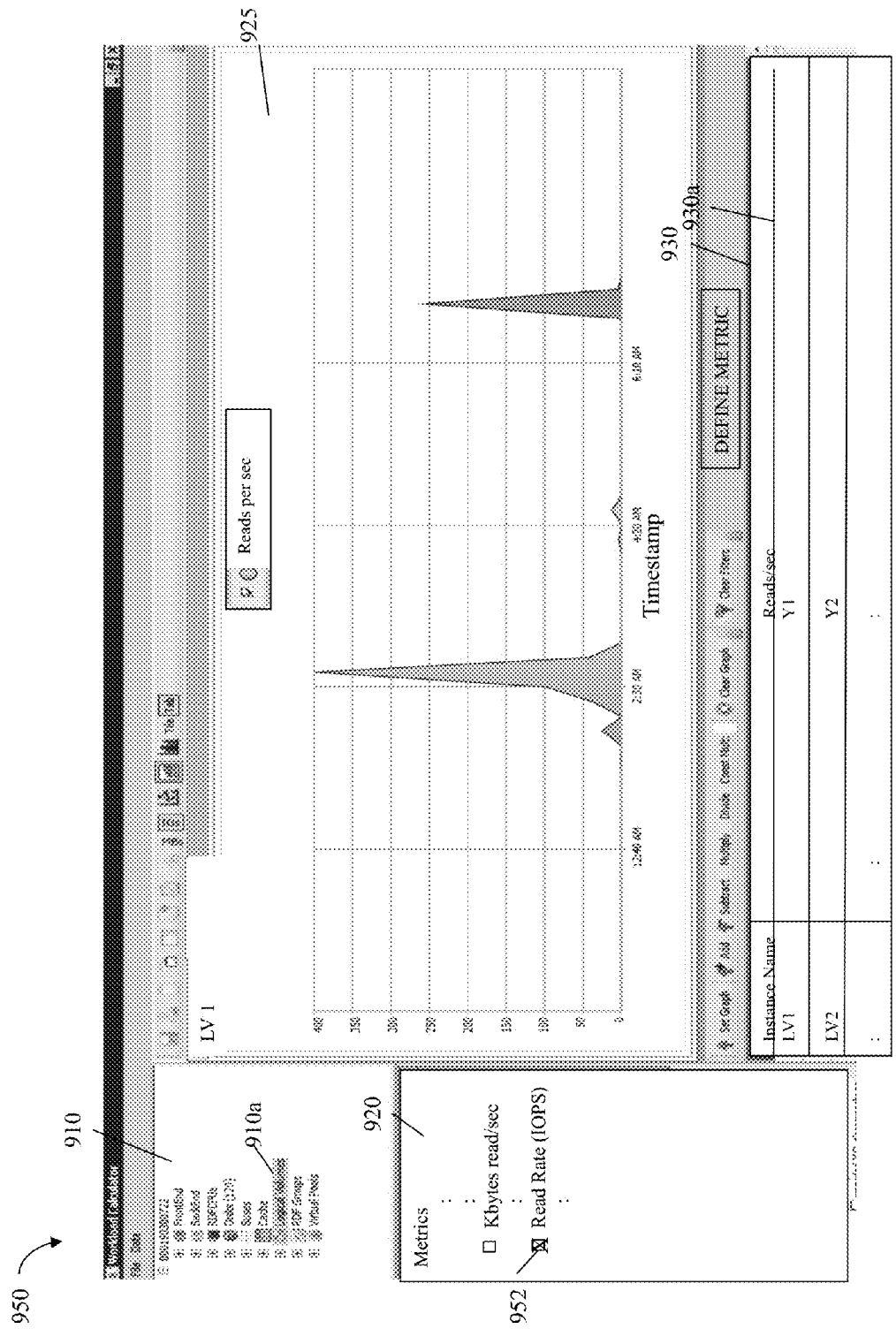

In a similar manner with reference now to FIG. 11B, a user may select 952 to view the metric read rate for the logical volumes and then select a particular logical volume instance such as by selecting row 930a of the displayed information in area 930 to selected LV1. In response to selecting 930a, area 925 may be updated to graphically display the selected metric of read rate (reads per second) for the selected LV1.

Figure 11C:
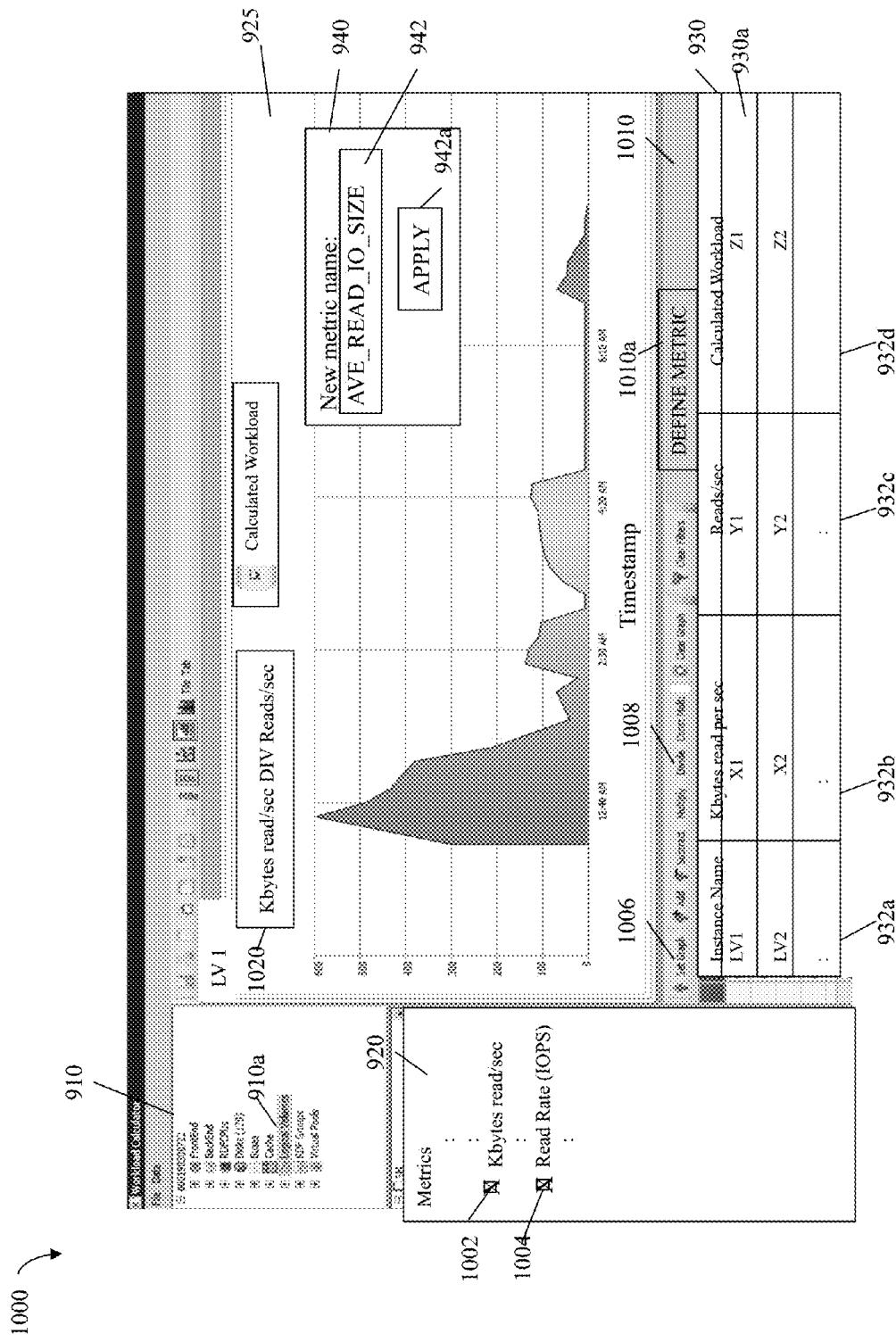

With reference now to FIG. 11C, what will now be illustrated are the various user interface selections made in order to use the division operator to calculate and display the average I/O size for the selected logical volume.

A user may select logical volumes 910a as described above. A user may select a first metric, Kbytes read/second 1002, also noted above as the read throughput or read data transfer rate, and may also select a second metric, read rate 1004. In response, area 930 may be updated to initially display the information in columns 932a-c in area 930. Initially, nothing may be displayed in area 925. The currently selected logical volume may be LV1 denoted by selecting row 930a from area 930.

What will now be described are steps that may be performed in one embodiment to define a calculation of the first metric divided by the second metric and also display the calculation result graphically in area 925 for a currently selected logical volume, such as LV1, selected from area 930.

To define the calculation, a user may perform a first step to select the first metric Kbytes read per second. In the exemplary 1000, selection of the foregoing first metric may be performed by selecting the header of column 932b for Kbytes read per second identifying the first metric. As a second step, a user may select the set graph button 1006. As a third step, a user may select the divide button 1008 from the panel 1010 of operation buttons. As a fourth step, a user may select the second metric read rate. In the exemplary 1000, selection of the foregoing second metric may be performed by selecting the header of column 932c for the read rate denoted as reads per second. Selection of the foregoing series of buttons may define a mathematical calculation of the first metric, Kbytes read/second, divided by the second metric, read rate. The calculation result of the foregoing is the average I/O size for read operations. It should be noted that values for the foregoing first and second metrics may also be average values.

The result of the foregoing division calculation may be performed for each logical volume instance in area 930 and the calculation results displayed in column 930d. Area 925 may be updated to graphically display the calculation results for the currently selected logical volume which, in this example, is LV1 930a.

In this example, other possible mathematical operations specified in the panel 1010 that may be selected besides divide 1008 include add, subtract and multiply to respectively perform the selected mathematical operation in a manner similar to that as described herein for divide 1008.

The user interface may include area 1020 which may automatically determine and output in a text form an expression reflecting the current workload calculation performed as a result of a series of user interface selection just described above. An embodiment may allow a user to define a new user-defined metric based on the calculation denoted in 1020. In one embodiment, a user may select the DEFINE METRIC button 1010a to define a new metric based on the current expression denoted in 1020. In response to selection of 1010a, dialog box 940 may be displayed that prompts the user to enter in area 942 a new metric name. In this example, the user may enter AVE_READ_IO_SIZE as the new metric name in area 942 and then select the apply button 942a. Selection of 942a may result in defining a new user-defined logical volume metric of AVE_READ_IO_SIZE determined based on the expression denoted in 1020. Additionally, area 920 may be updated to also include the new user-defined metric of AVE_READ_IO_SIZE. As described herein, the user-defined metric AVE_READ_IO_SIZE may be selected and use in subsequent calculations and filtering criteria like any other metric in area 920.

Thus, FIG. 11C illustrates another example in which user interface selections are made to define filtering criteria denoted by 1020. Additionally, the example 1000 illustrates how such filtering criteria may be saved and used as new metric. Such new user-defined metrics may be further utilized in subsequent analysis. For example, the new metric AVE_READ_IO_SIZE may also be used in performing other calculations and operations.

Figure 12:
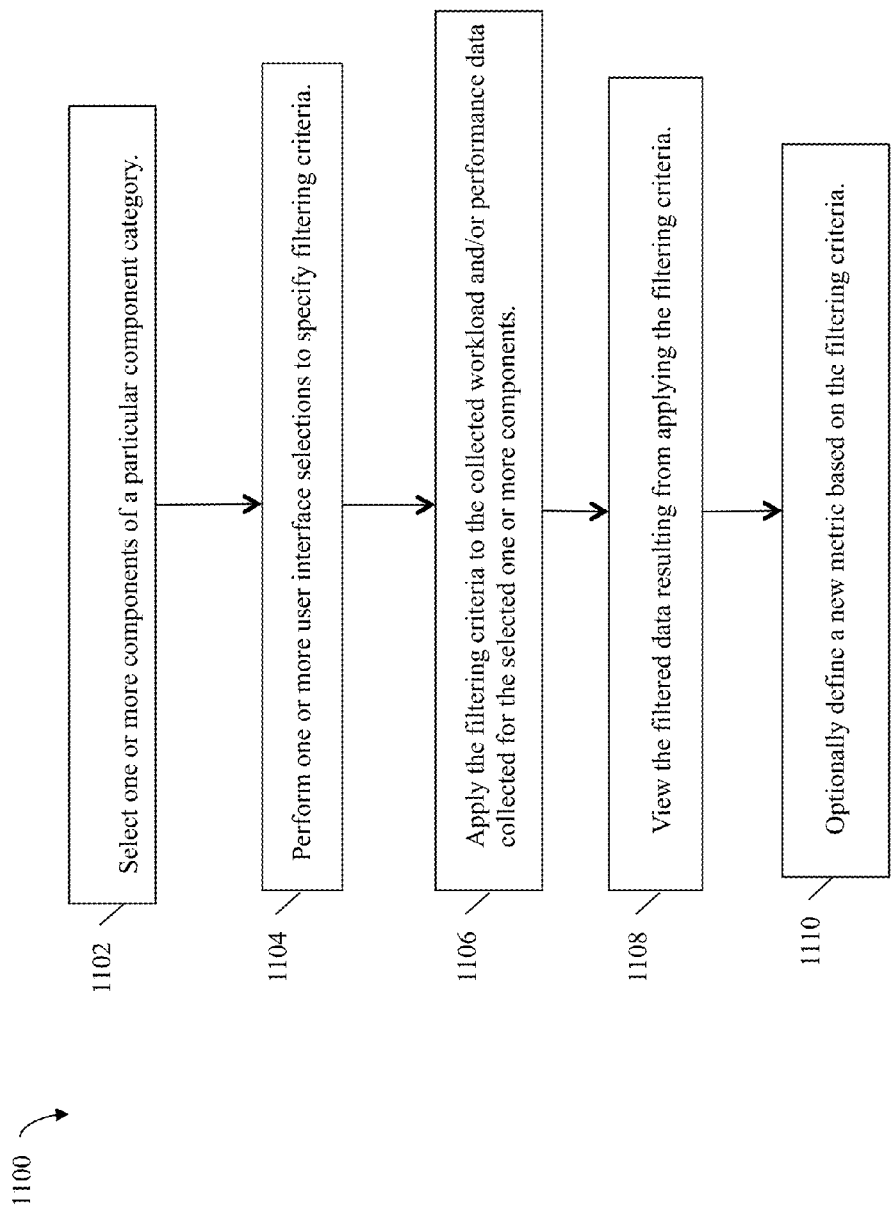
FIG. 12 is a flowchart of processing that may be performed in an embodiment in accordance with techniques herein.

Referring to FIG. 12, shown is a flowchart summarizing processing that may be performed in an embodiment in accordance with techniques herein. The steps of 1100 summarize processing as described above. In step 1102, one or more components of a particular category may be selected. In step 1104, one or more user interface selections or interactions are performed to specify filtering criteria. In step 1106, the filtering criteria is applied to the collected workload and/or performance data collected for the selected one or more components. In step 1108, a user may view the filtered data resulting from applying the filtering criteria in step 1106. In step 1110, processing may be performed to optionally define a new metric based on the filtering criteria specified in step 1104. As described herein, the new metric may then be further used as filtering criteria in subsequent filtering. For example, steps of flowchart 1100 may be repeated any number of times whereby a first iteration of steps 1100 results in defining a first new metric that may then be specified in filtering criteria of subsequent iterations of flowchart 1100.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing collected workload and performance data comprising:
   selecting one or more components of a component category;
   specifying filtering criteria, wherein the filtering criteria includes a first operation and a first set of one or more metrics included in the collected workload and performance data for the one or more components selected, wherein said first operation is applied to the first set of one or more metrics and is selected from a plurality of operations, the plurality of operations including at least one arithmetic operation, at least one logical operation and at least one relational operation, wherein said specifying includes executing an interactive dialogue to build an expression denoting the filtering criteria, the interactive dialogue including a plurality of steps to obtain a plurality of corresponding user inputs, wherein for each of the plurality of steps obtaining one of the corresponding user inputs, a different portion of the filtering criteria as included in the expression is generated;
   displaying the expression denoting the filtering criteria;
   customizing a display area, said customizing including:
      selecting one of a plurality of display forms for viewing information in the display area; and
      selecting for viewing a second set of one or more metrics for the selected one or more components, wherein the second set of one or more metrics comprises at least one metric not included in the first set of one or more metrics of the filtering criteria;
   applying the filtering criteria to the collected workload and performance data for the one or more components selected and thereby generating filtered data results; and
   viewing, in the display area in accordance with the selected one display form, the second set of one or more metrics from the filtered data results, wherein the component category is selected from a plurality of component categories including any of a category of front end components of a data storage system, a category of back end components of a data storage system, a category of front end adapters that receive data operations from clients at a data storage system, a category of disk adapters that access physical storage devices of a data storage system to perform I/O operations, a category of physical storage devices, a category of logical volumes, a category of remote data facility groups, a category of virtual pools, a category of buses, a category of cache, and a category of adapters used with a remote data facility for data replication and wherein the plurality of display forms include a graph, a list, a histogram, and a pie chart.

2. The method of claim 1, wherein the at least one arithmetic operation includes any of addition, subtraction, multiplication, division and exponential operation.

3. The method of claim 1, wherein the at least one logical operation includes any of a logical NOT operation, a logical AND operation, a logical OR operation, a logical XOR (exclusive OR) operation, a logical NOT operation, a logical NOR (logical NOT of logical OR) operation, a logical NAND (logical NOT of logical AND) operation.

4. The method of claim 1, wherein the at least one relational operation includes any of greater than, less than, equal to, not equal to, greater than or equal to, and less than or equal to.

5. The method of claim 1, wherein the plurality of operations includes a set operation.

6. The method of claim 1, further comprising:
   defining a new user-defined metric based on the filtering criteria.

7. The method of claim 6, further comprising:
   selecting a first component set of one or more components of a component category;
   specifying second filtering criteria, wherein the second filtering criteria includes the new user-defined metric;
   applying the second filtering criteria to the collected workload and performance data for the first component set and thereby generating second filtered data results; and
   viewing the second filtered data results.

8. The method of claim 1, wherein the component category selected is the category of front end components and the first set of one or more metrics includes any of a read hit rate, a read miss rate, a read rate, a write rate, a sequential read rate, a random read rate, a write hit rate, a write miss rate, a sequential write rate, a random write rate, a queue depth denoting an average number of pending I/O operations, overall average I/O rate, average response time, average I/O size, average write I/O size, and average read I/O size.

9. The method of claim 1, wherein the component category selected is the category of back end components and the first set of one or more metrics includes any of overall average I/O rate, a read rate, a sequential read rate, a random read rate, a write rate, a sequential write rate, a random write rate, a backend write rate denoting a rate of write operations performed which do not use a front end component, a backend read rate denoting a rate of read operations performed which do not use a front end component, average I/O size, average write I/O size, average read I/O size, average read data transfer rate, average write data transfer rate, average response time.

10. The method of claim 1, wherein the component category selected is the category of physical storage devices, and the first set of one or more metrics includes any of overall average I/O rate, a read rate, a sequential read rate, a random read rate, a write rate, a sequential write rate, a random write rate, a backend write rate denoting a rate of write operations performed which do not use a front end component, a backend read rate denoting a rate of read operations performed which do not use a front end component, average I/O size, average write I/O size, average read I/O size, average read data transfer rate, average write data transfer rate, average response time.

11. The method of claim 1, wherein the component category selected is the category of logical volumes and the first set of one or more metrics includes any of a read hit rate, a read miss rate, a read rate, a write rate, a sequential read rate, a random read rate, a write hit rate, a write miss rate, a sequential write rate, a random write rate, a queue depth denoting an average number of pending I/O operations, overall average I/O rate, average response time, average I/O size, average write I/O size, average read I/O size, a prefetch cache hit ratio, and a prefetching rate at which data is prefetched.

12. The method of claim 11, wherein the filtering criteria further includes one or more properties of a logical volume, the one or more properties including any of a logical volume type, a cylinder size, and a RAID protection level.

13. The method of claim 1, wherein said specifying the filtering criteria includes performing one or more user interface selections.

14. A non-transitory computer readable medium comprising code stored thereon that, when executed, performs a method comprising:
selecting one or more components of a component category;
specifying filtering criteria, wherein the filtering criteria includes a first operation and a first set of one or more metrics included in the collected workload and performance data for the one or more components selected, wherein said first operation is applied to the first set of one or more metrics and is selected from a plurality of operations, the plurality of operations including at least one arithmetic operation, at least one logical operation and at least one relational operation, wherein said specifying includes executing an interactive dialogue to build au expression denoting the filtering criteria, the interactive dialogue including a plurality of steps to obtain a plurality of corresponding user inputs, wherein for each of the plurality of steps obtaining one of the corresponding user inputs, a different portion of the filtering criteria as included in the expression is generated;
displaying the expression denoting the filtering criteria;
customizing a display area, said customizing including:
selecting one of a plurality of display forms for viewing information in the display area; and
selecting for viewing a second set of one or more metrics for the selected one or more components, wherein the second set of one or more metrics comprises at least one metric not included in the first set of one or more metrics of the filtering criteria;
applying the filtering criteria to the collected workload and performance data for the one or more components selected and thereby generating filtered data results; and
viewing, in the display area in accordance with the selected one display form, the second set of one or more metrics from the filtered data results, wherein the component category is selected from a plurality of component categories including any of a category of front end components of a data storage system, a category of back end components of a data storage system, a category of front end adapters that receive data operations from clients at a data storage system, a category of disk adapters that access physical storage devices of a data storage system to perform I/O operations, a category of physical storage devices, a category of logical volumes, a category of remote data facility groups, a category of virtual pools, a category of buses, a category of cache, and a category of adapters used with a remote data facility for data replication and wherein the plurality of display forms include a graph, a list, a histogram, and a pie chart.

15. The non-transitory computer readable medium of claim 14, wherein the at least one arithmetic operation includes any of addition, subtraction, multiplication, division and exponential operation.

16. The non-transitory computer readable medium of claim 14, wherein the at least one logical operation includes any of a logical NOT operation, a logical AND operation, a logical OR operation, a logical XOR (exclusive OR) operation, a logical NOT operation, a logical NOR (logical NOT of logical OR) operation, a logical NAND (logical NOT of logical AND) operation.

17. A system comprising:
a processor; and
a memory including instructions thereon that, when executed, perform a method for processing collected workload and performance data comprising:
selecting one or more components of a component category;
specifying filtering criteria, wherein the filtering criteria includes a first operation and a first set of one or more metrics included in the collected workload and performance data for the one or more components selected, wherein said first operation is applied to the first set of one or more metrics and is selected from a plurality of operations, the plurality of operations including at least one arithmetic operation, at least one logical operation and at least one relational operation, wherein said specifying includes executing an interactive dialogue to build an expression denoting the filtering criteria, the interactive dialogue including a plurality of steps to obtain a plurality of corresponding user inputs, wherein for each of the plurality of steps obtaining one of the corresponding user inputs, a different portion of the filtering criteria as included in the expression is generated;
displaying the expression denoting the filtering criteria;
customizing a display area, said customizing including:
selecting one of a plurality of display forms for viewing information in the display area; and
selecting for viewing a second set of one or more metrics for the selected one or more components, wherein the second set of one or more metrics comprises at least one metric not included in the first set of one or more metrics of the filtering criteria;
applying the filtering criteria to the collected workload and performance data for the one or more components selected and thereby generating filtered data results; and
viewing, in the display area in accordance with the selected one display form, the second set of one or more metrics from the filtered data results, wherein the component category is selected from a plurality of component categories including any of a category of front end components of a data storage system, a category of back end components of a data storage system, a category of front end adapters that receive data operations from clients at a data storage system, a category of disk adapters that access physical storage devices of a data storage system to perform I/O operations, a category of physical storage devices, a category of logical volumes, a category of remote data facility groups, a category of virtual pools, a category of buses, a category of cache, and a category of adapters used with a remote data facility for data replication and wherein the plurality of display forms include a graph, a list, a histogram, and a pie chart.

* * * * *

UNITED STATES PATENT AND TRADEMARK OFFICE
CERTIFICATE OF CORRECTION

PATENT NO.        : 9,870,434 B1
APPLICATION NO.   : 14/310150
DATED             : January 16, 2018
INVENTOR(S)       : Gil Ratsaby et al.

Page 1 of 1

It is certified that error appears in the above-identified patent and that said Letters Patent is hereby corrected as shown below:

In the Claims

Column 25, Line 34, Claim 14 should read:
--build an expression denoting the filtering criteria, the--

Signed and Sealed this
First Day of May, 2018

Andrei Iancu
*Director of the United States Patent and Trademark Office*